(12) United States Patent
Campbell et al.

(10) Patent No.: US 8,860,748 B2
(45) Date of Patent: Oct. 14, 2014

(54) COMPUTERIZED, PERSONAL-COLOR ANALYSIS SYSTEM

(76) Inventors: Gary Lynn Campbell, Rigby, ID (US); Susan Lynn Stucki, Idaho Falls, ID (US)

( * ) Notice: Subject to any disclaimer, the term of this patent is extended or adjusted under 35 U.S.C. 154(b) by 881 days.

(21) Appl. No.: 11/507,979

(22) Filed: Aug. 22, 2006

(65) Prior Publication Data

US 2007/0076013 A1 Apr. 5, 2007

Related U.S. Application Data

(60) Provisional application No. 60/723,177, filed on Oct. 3, 2005, provisional application No. 60/732,330, filed on Oct. 31, 2005.

(51) Int. Cl.
*G09G 5/02* (2006.01)
*G09G 5/06* (2006.01)

(52) U.S. Cl.
CPC .......... *G09G 5/06* (2013.01); *G09G 2320/0606* (2013.01); *G09G 2320/0666* (2013.01)
USPC ........................................................ 345/593

(58) Field of Classification Search
USPC ................... 345/594, 630; 356/405
See application file for complete search history.

(56) References Cited

U.S. PATENT DOCUMENTS

| | | | | |
|---|---|---|---|---|
| 4,681,546 A | * | 7/1987 | Hart | 434/99 |
| 5,174,758 A | * | 12/1992 | Abramson | 434/98 |
| 5,313,267 A | | 5/1994 | MacFarlane et al. | |
| 5,797,750 A | * | 8/1998 | Gouriou et al. | 434/100 |
| 6,000,407 A | * | 12/1999 | Galazin | 132/200 |
| 6,112,665 A | * | 9/2000 | Teter et al. | 101/483 |
| 6,178,341 B1 | * | 1/2001 | Macfarlane et al. | 600/310 |
| 6,330,341 B1 | * | 12/2001 | Macfarlane et al. | 382/100 |
| 6,980,888 B2 | * | 12/2005 | Baker et al. | 700/236 |
| 7,151,851 B2 | * | 12/2006 | Ladjevardi | 382/162 |
| 7,180,524 B1 | * | 2/2007 | Axelrod | 345/593 |
| 2002/0059248 A1 | * | 5/2002 | Farchione | 707/10 |
| 2003/0007684 A1 | * | 1/2003 | Kato et al. | 382/165 |
| 2005/0213125 A1 | * | 9/2005 | Smith et al. | 358/1.9 |

OTHER PUBLICATIONS

Robert Hess; "Wheel of Color;" Microsoft Corporation; Aug. 2000; available at http://msdn.microsoft.com/en-us/library/bb263947(d=printer,v=vs.85).aspx.*

* cited by examiner

*Primary Examiner* — Edward Martello
(74) *Attorney, Agent, or Firm* — Michael B Dodd; Dodd Law Group

(57) ABSTRACT

A method and apparatus to automatically generate a customized color palette receives data corresponding to several physical attributes of a living subject, such as hair, skin and eyes and conducts an analysis uniquely corresponding to each attribute, and may associate each attribute with at least one property such as a color family, a technical identifier, an intensifier, a temperature, a power color, and a saturation designation. Software may identify the color linked to each attribute by, for example, an LAB value, an RGB value, an HTML value, an XYZ value or a CMY value, while an intensifier may be a contrasting color, and saturation may indicate whether the color linked to the attribute is a tone, tint, shade or hue. A color palette uniquely compatible with the subject may be presented by print media, monitor, printer, cell phone, personal digital assistant, or the like.

20 Claims, 11 Drawing Sheets

COMPUTERIZED, PERSONAL-COLOR ANALYSIS SYSTEM

RELATED APPLICATIONS

This application claims the benefit of co-pending U.S. Provisional Patent Application Ser. No. 60/723,177 filed on Oct. 3, 2005 for METHOD AND APPARATUS FOR PROVIDING A CUSTOMIZED COLOR PALETTE, and co-pending U.S. Provisional Patent Application Ser. No. 60/732,330 filed on Oct. 31, 2005 for APPARATUS AND METHOD FOR GENERATING A CUSTOMIZED COLOR PALETTE.

BACKGROUND

1. The Field of the Invention

This invention relates to apparatus and methods for generating an individualized color palette and, more particularly, to novel systems and methods for automatically generating a color palette customized to complement the existing coloring of a subject.

2. The Background Art

Proper color selection and coordination in cosmetics, clothing, jewelry, and other personal applications can have a highly positive impact on an individual's social interactions, personal and professional achievement, physical and mental health, and various other aspects of life, in addition to enhancing the individual's personal appearance. Similarly, non-harmonious color combinations may detrimentally affect many aspects of an individual's well-being and success. The ability to select pleasing color combinations that are harmonious with an individual's natural coloring is thus critical, although sometimes underestimated by those outside fashion circles.

While systems and methods of color identification and coordination are known, personalized color harmonization systems aimed to complement the existing coloring of an individual's skin, hair, and eyes present unique challenges. Human coloration is extremely diverse. Accordingly, systems that categorize a person's coloring broadly, according to one of the four seasons for example, may be unable to identify an individual's unique color characteristics with sufficient accuracy to enable consistently harmonious color recommendations. Similarly, systems that focus color analysis and associated harmonious color recommendations on the color characteristics of a single trait may define color compatibility too narrowly to account for an individual's diverse color characteristics, therefore unduly restricting a recommended color palette.

The subjective perception of color often relied on to identify an individual's existing coloring is also prone to inaccuracies and resulting inconsistencies in harmonious color recommendations. Many known color identification methods, for example, utilize draping techniques, whereby drapes of a series of colors are placed adjacent an individual's face, to assess color and color compatibility. Other color identification methods require applying various colored powders to the skin of an individual for comparative analysis. Such subjective approaches to color assessment often render unrepeatable results and inaccurate harmonious color recommendations.

These inaccuracies limit the usefulness and increase costs associated with known methods and systems for identifying and analyzing individual color characteristics and providing harmonious color recommendations. What is needed is an apparatus and method applying objective, automated expertise to generate a customized color palette. What is further needed is an apparatus and method that accurately assesses more than one physical trait to maximize a range of consistently compatible color recommendations. Finally, what is needed is an apparatus and method providing scientifically sound, repeatable color recommendations uniquely compatible with the existing coloring of an individual.

Such apparatus and methods are disclosed and claimed herein.

BRIEF SUMMARY OF THE INVENTION

In view of the foregoing, in accordance with the invention as embodied and broadly described herein, a method and apparatus are disclosed in embodiments of the present invention for automatically generating a customized color palette. The apparatus may store data structures, including an assessment module, a determination module, and an association module.

In one embodiment, an assessment module receives data corresponding to each attribute of a plurality of physical attributes of a subject. The assessment module, for example, may receive data corresponding to a subject's hair, skin and eyes. Based on this data, the assessment module may output an analysis uniquely corresponding to each attribute.

In some embodiments, the assessment module includes a query module to link each attribute to a color from a database. The query module may further associate each attribute with at least one property such as a color family, a technical identifier, an intensifier, a temperature, a power color, and a saturation designation.

In one embodiment, the color family is defined by a beginning value and an ending value in accordance with an expert analysis. The temperature may be designated as warm, cool, or neutral and, in some embodiments, includes a temperature coefficient to indicate a relative temperature of the attribute. The technical identifier may identify the color linked to each attribute by, for example, an LAB value, an RGB value, an HTML value, an XYZ value or a CMY value, while the intensifier may identify a contrary color having a position on a color wheel substantially opposite the color linked to the attribute. The saturation designation may indicate whether the color linked to the attribute is a tone, tint, shade, or hue.

The assessment module may include a determination module to determine a color class corresponding to the subject. The color class may be determined based on an accumulation of outputs from the query module. In one embodiment, for example, the determination module averages the technical identifiers corresponding to each attribute and characterizes the result as a particular color class in accordance with an expert analysis.

The association module may then utilize outputs from the query and determination modules to create a color palette uniquely compatible with the subject. In one embodiment, the color palette contains member colors identified by technical identifiers, where each identifier uniquely represents constituents of its corresponding member color. In some embodiments, the association module further matches each of the member colors with one or more properties corresponding to each attribute such as, for example, a color family, an intensifier, a temperature, a power color, or a saturation designation.

Finally, the presentation module may present the color palette to a user. The presentation module may include an identifier conversion module to convert a technical identifier of the attribute or the member color to a visual representation. A display module may display the visual representation to a user by way of an output device such as a monitor, a printer, or a mobile handheld device such as a cell phone, personal digital assistant, or the like.

A method of the present invention is also presented to automatically generate a customized color palette to be compatible with the existing coloring of a subject. The method in the disclosed embodiments substantially includes steps to carry out the functions presented above with respect to the operation of the described apparatus. In one embodiment, the method includes corresponding each of a plurality of physical attributes of the subject to a color matched thereto from a database of colors. The method then accumulates data corresponding to each attribute, and determines, based on the accumulated data, a color class corresponding to the subject. The method further includes creating, based on the color class and attributes, a color palette uniquely compatible with the subject and presenting the color palette to a user.

In one embodiment, the method further includes providing a scanning device to scan each attribute and output at least one identifier uniquely corresponding thereto. The scanning device may include, for example, a colorimeter or a spectral photometer. The method may further include scanning, with the scanning device, the attribute.

In some embodiments, the method further includes providing, based on the color palette, product suggestions to the user. Product suggestions may be general or may specifically identify products produced by a certain manufacturer. The method may also include querying the user for a condition of the attribute to narrow the suggested products to those particularly suited to the subject.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
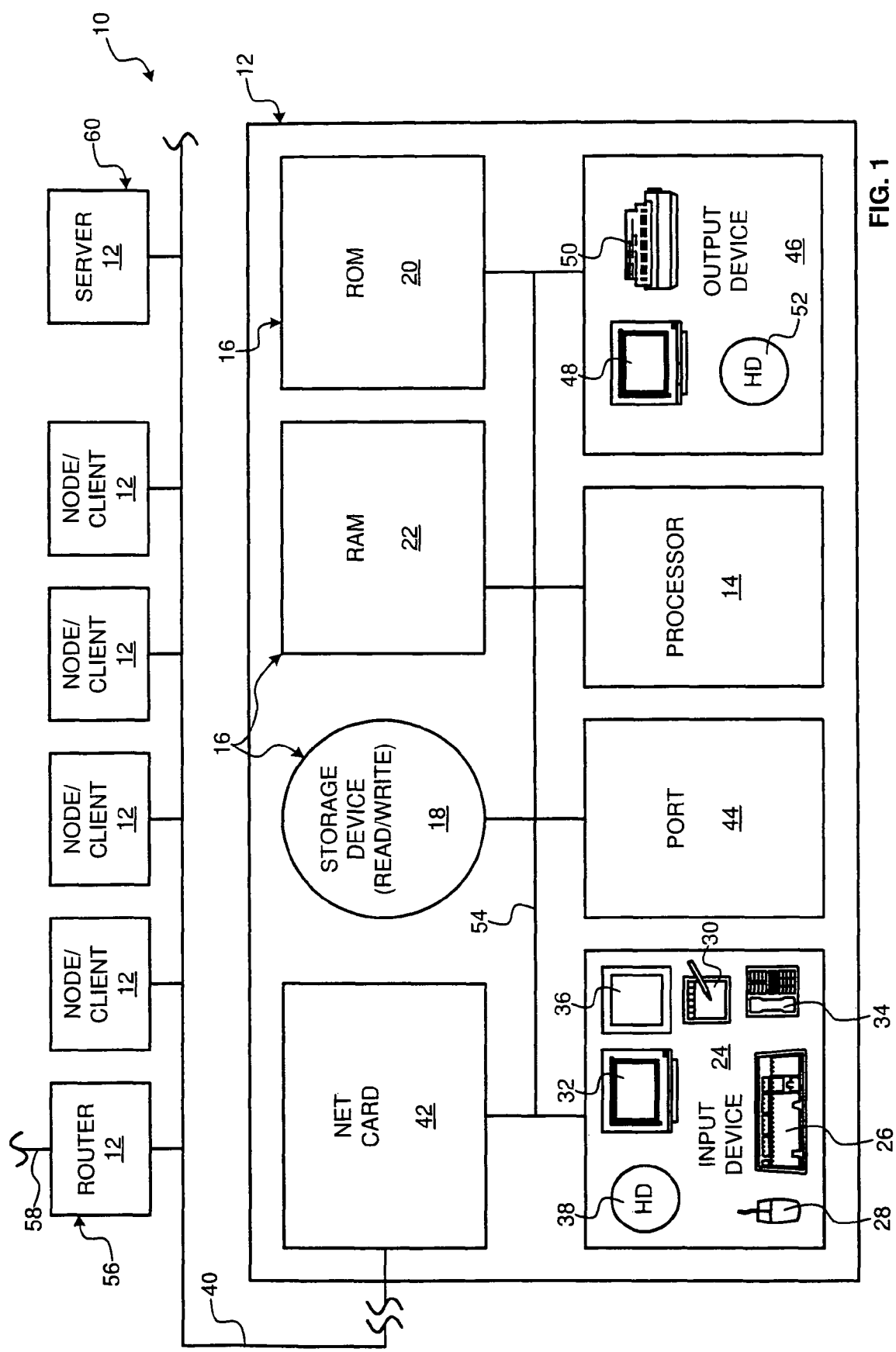
FIG. 1 is a schematic block diagram illustrating one embodiment of a computer system for implementing a system for generating a customized color palette in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

As used in this specification, the term "LAB" refers to a system for describing, measuring, and controlling color using hue, luminescence, and brightness as established by the International Committee on Illumination ("ICI"). The term "RGB" refers to an additive color system where red, green and blue are the primary colors. The term "HTML" refers to Hyper-Text Markup Language, the coding language used to create hypertext documents for the world wide web. The term "XYZ" refers to a system for describing color based on luminescence ("Y") and two additional components ("X" and "Z"). The spectral weighting curves of X and Z have been standardized by the ICI0, based on statistics from experiments involving human observers. The term "CMY" or "CMYK" refers to a subtractive color model used primarily in color printing, where cyan, magenta, yellow and black inks can be overlaid to produce any color.

Colors may include both the primary pigment of the color, as well as some amount of white, black, or gray. Grays come in various degrees themselves. Nevertheless, it is standard in photography to understand the concept of a neutral gray. Neutral gray is well defined. Neutral gray may be used as a gray addition to a pigment in order to modify the particular color.

In general, tinting a pigment comprises adding white to the pigment. Toning a color involves adding gray to a color. Shading a color involves the addition of black to the color.

Thus, one may think of a set of polar coordinates in which the radial coordinate represents intensity, while the vertical axis or the polar axis represents a range running from completely white at one extreme, for example at the top, while the opposite direction of the polar axis represents complete black. Of course, this set of polar coordinates may be truncated at any particular level of white constituent and at any particular level of a gray constituent. In such a set of coordinates, one may pick a zero plane in the circular or radial plane to be one in which there is no tint, since there is no additional white, there is not shade, since there is no additional black, and there is only tone, or an amount of pure gray.

Meanwhile, the radial direction includes an indication of the amount of pigment or saturation. For example, a greater value in the radial direction indicates more of the pigment.

The circumferential direction in this three-dimensional coordinate system represents the colors or basic hues themselves. Thus, to travel around the circular plane of the radial axis (rotating about the polar axis) is to change the basic hue or pigment.

Thus, along the polar axis (visualize the vertical, for convenience) is the content of shade at the lowest values, tone in the central values, and tint at the highest values. About the circumferential direction is the color or color family. For example, in an RGB scheme, the circumferential direction moves to red, then green, then blue, then red, with each of the mixtures in between.

In another color system, such as the CMY, the colors making up principal use may be cyan, a bluish principal color, magenta, a reddish principal color, and yellow.

Various other schemes of colors exist. For example, most computers and computerized display systems use the RGB (red, green, blue) system. However, other systems exist such as an LAB system and an XYZ system. Also, an HTML system exists. Each of these systems has a basic set of colors. Likewise, the "four-color-system," or CMYK system, is often used by printers. It includes cyan, magenta, yellow, and black and is typically used in print media.

A color may be identified by the fraction, percentage, proportion, or absolute value of constituent components. For example, a color system having three primary colors on a Cartesian or polar coordinate system may have a vector identified by a value of x, a value of y, and a value of z. That vector will thus point to a position in a three-dimensional space. The value of that vector is unique and identifies one combination of those three primary pigments.

A polar coordinate system previously described has three dimensions, namely axial (along the polar coordinate), radial (outward from the polar axis or inward toward the polar axis), and circumferential (some angular displacement in a circumferential direction about the pole, starting from some datum or zero reference). In classical mathematics, axes may run from zero to infinity, or from negative infinity to positive infinity. Thus, in one embodiment of the apparatus in accordance with the invention, a polar coordinate system may run from some negative value constituting pure black, to some positive value along the polar axis constituting pure white.

The end points of the practical axis may be minus one and one, respectively, or may be minus one hundred and positive one hundred, or may be minus infinity and positive infinity. Any number will serve. Likewise, a finite number may serve as a practical limit, although the axis need not have a finite limit. Nevertheless, intensity may be mapped from zero at the pole to a value of one at some radial maximum distance from the pole. Likewise, some maximum may be defined as one hundred, while the polar position remains zero.

In a circumferential direction, an angle may conveniently describe the position in the radial direction. Thus, the angle may vary from zero to 360 degrees, or from zero to 2xPi radians, or the like.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, a cell phone, a personal digital assistant ("PDA"), a media content player such as an iPod®, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
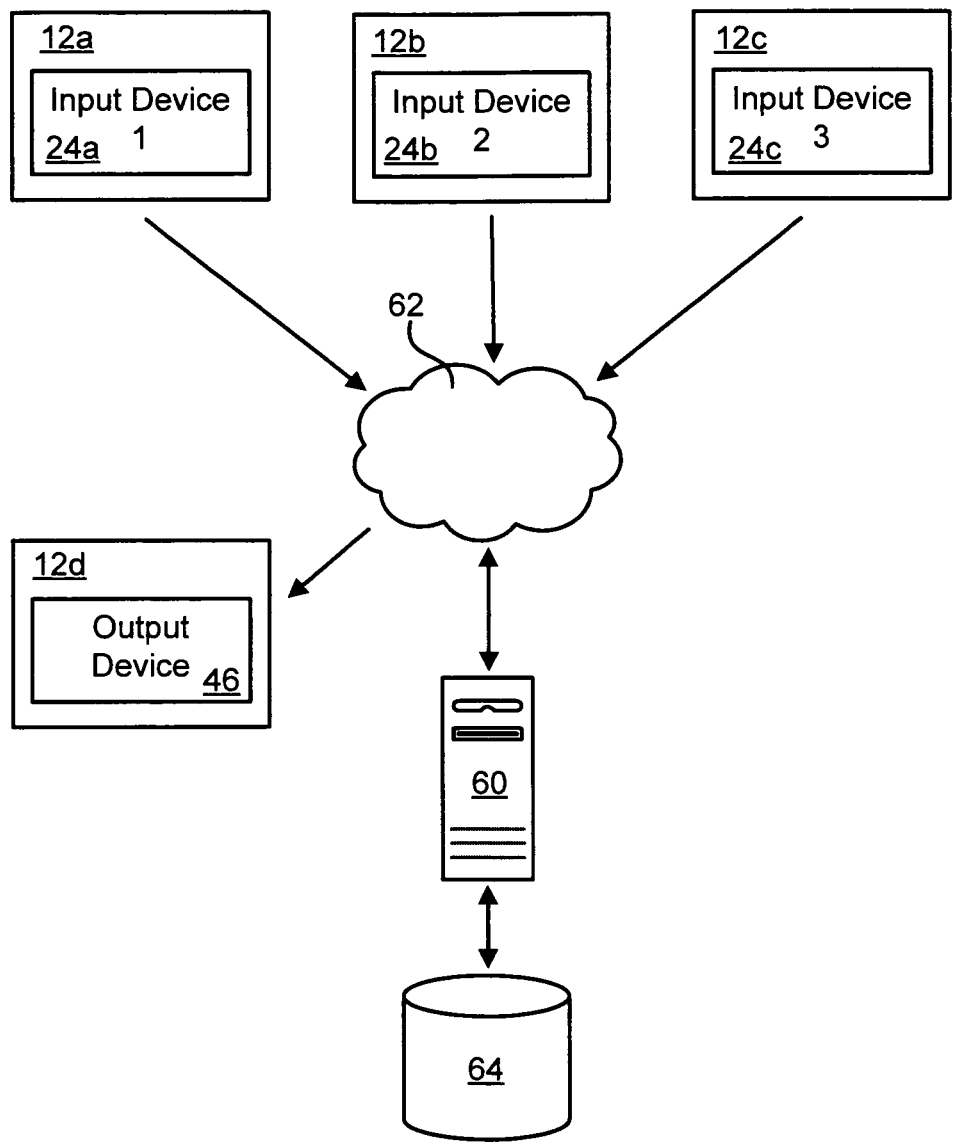
FIG. 2 is a schematic block diagram illustrating a high-level overview of one embodiment of a system for generating a customized color palette in accordance with the present invention.
Figure 3:
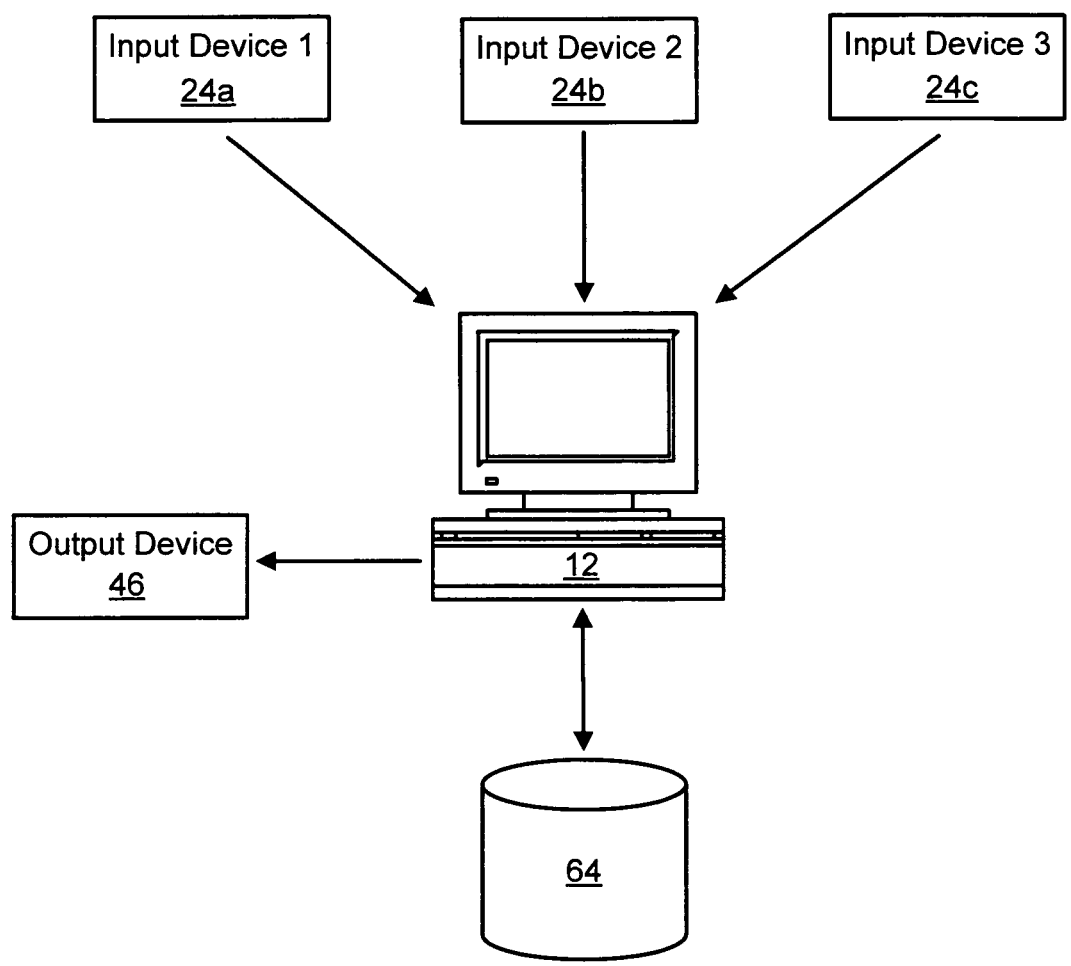
FIG. 3 is a schematic block diagram illustrating an alternative embodiment of the system of FIG. 2.

Referring to FIGS. 2 and 3, a system 10 for implementing an apparatus 10 in accordance with certain embodiments of the present invention may include one or more nodes 12a, 12b, 12c communicating with a server 60 over a network 62 such as the internet. Each node 12a, 12b, 12c may include an input device 24a, 24b, 24c capable of gathering information corresponding to at least one physical attribute of a subject.

For example, in one currently contemplated embodiment, each of the input devices 24 corresponds to a different location, dealer, color coordination consultant, or the like responsible to make analyses and take data with respect to subjects (e.g. customers, persons, animals, etc.). Alternatively, a system 10 for implementing an apparatus 10 in accordance with the present invention may include one or more input devices 24a, 24b, 24c communicating directly with a personal computer 12 or other processing device. An input device 24a, 24b, 24c may include, for example, a keyboard, a scanner, a touch screen, a mouse, or any other input device 24a, 24b, 24c known to those in the art.

In one embodiment, the input device 24a, 24b, 24c comprises a scanning device adapted to isolate and scan at least a portion of a physical attribute. The scanning device may detect color by its response to a particular, known, light source. A scanning device may comprise, for example, a colorimeter or spectral photometer. The scanning device may scan a physical attribute such as the skin, hair, eyes, or any other physical attribute known to those in the art.

While eye color may be detected and evaluated by its response to a light source as discussed above, bright lights, particularly coherent (laser) light, may cause some concern to certain individuals. Even lasers that are ostensibly safe, may be unsafe if used improperly. Likewise, even if a laser is safe, an individual may have insufficient information to trust that it is indeed safe.

Accordingly, eye color may also be matched by a comparison with a color sample. For example, a color chart, table, or various swatches or cards containing exemplary eye colors may be held near the eye, and compared by visual inspection by an analyst. Accordingly, by direct measurement, or by a comparative evaluation by a person, an eye color may be selected.

Similarly, skin and hair colors may also be evaluated by a comparative process. That is, various swatches may be compared with hair color, skin color, or both. Nevertheless, the variation of skin colors and hair colors is substantially greater than the variation in principal eye colors. Accordingly, the number of swatches required could be substantial and be less convenient than the digital electronic color detector.

In some embodiments, the scanning device enables a user to input information identifying a subject attribute. The user may then actuate the scanning device to detect a color uniquely corresponding to the attribute. In certain embodiments, the scanning device identifies the color by a unique numerical value representing constituents of the color such as, for example, an LAB value, an RGB value, an HTML value, an XYZ value, a CMY value, or any other unique numerical value known to those in the art.

In some embodiments, the scanning device includes an illumination element that illuminates a target area of the attribute to avoid inaccuracies in detected color resulting from variances in ambient light. The illumination element may be actuated substantially concurrently with the scanning device and may be calibrated to facilitate consistent and repeatable results.

A suitable color detector is produced by a company called Accuracy and branded exclusively for Pantone. The Pantone device has numerical values for colors in an absolute scale. One can turn to a book and find a color representative of substantially any color reading.

Nevertheless, the Pantone system is used for any color desired. Many colors may apply only to plants or inanimate objects. The system of colors for people is substantially less, and choices and selection criteria are unique. Moreover, selecting colors that are not natural will cause clashes and not appear pleasing to a viewer. Accordingly, the Pantone system can be used for virtually anything, but represents a larger universe, not adapted to evaluation of existing coloring of a human subject in order to match appropriate clothing and accessories for wear by that subject.

Following the scan, the outputs of the scanner 24 may be taken into a database 64 for the subject. A suitable processor 12 may be connected to the scanner 24 to receive the data. Likewise, if a comparison is made by card for any particular body color center, then a value input number corresponding to the card matched to a body color center may be input by an operator.

The scanning device or other input device 12a, 12b, 12c may transmit to a server 60 as illustrated by the network-based system 10 of FIG. 2, or to a personal computer 64 as illustrated in FIG. 3, the information gathered. The server 60 or personal computer 12 may communicate with a database 64 to correspond the information to a color in the database 64.

An apparatus and method in accordance with the invention may utilize the database 64 to store a range of colors along each of the axes of a color scheme as determined by expert analysis. The ranges can be used to define those colors that match particular characteristics. In one embodiment, as discussed in more detail below, an apparatus and method in accordance with the invention considers the skin color of a subject, the hair color of a subject, and the eye color of a subject. Typically, a skin table is set up in the database 64 to contain a range of colors for skin. A hair table may be set up to contain the variations in color of hair. Likewise, an eye table may be set up to include the various colors (values of color) for eyes. These colors may be converted to other systems, such as the LAB system, the XYZ system, the HTML system, or the like. Likewise, these colors could be related to the Pantone color numbers. Alternatively, these colors may relate to an independent color system.

Figure 4:
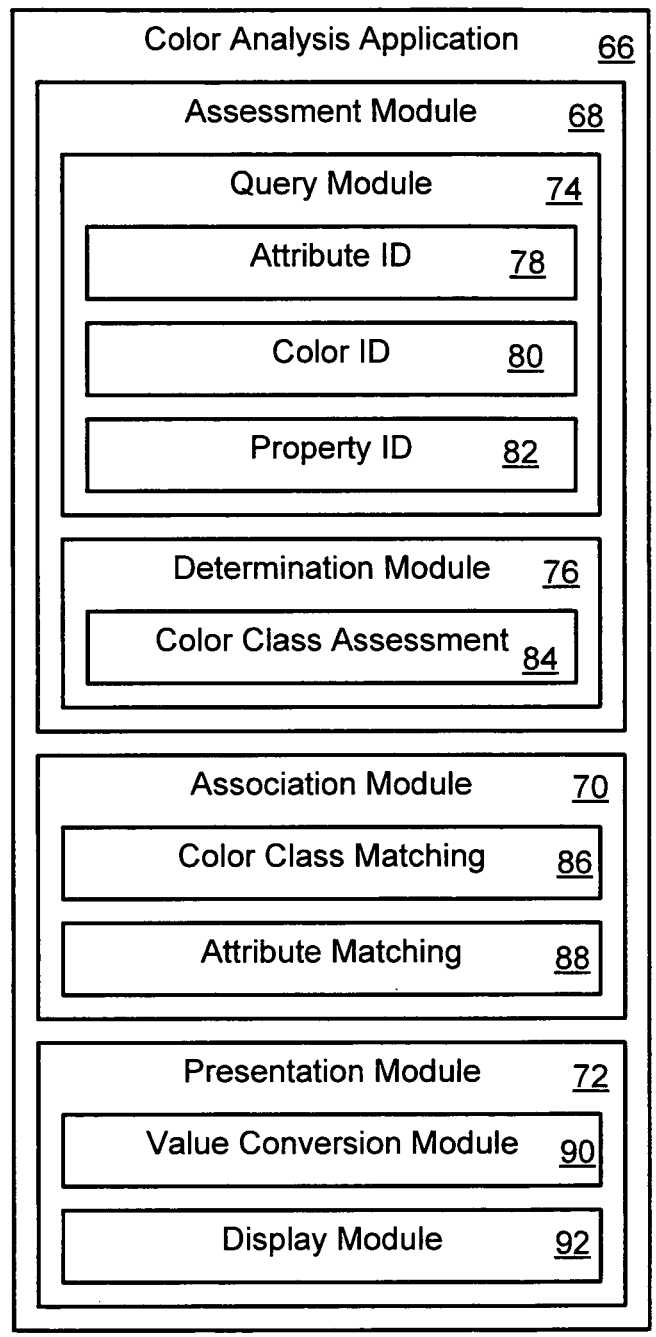
FIG. 4 is a block diagram of an apparatus for generating a customized color palette in accordance with certain embodiments of the present invention.

Referring to FIG. 4, an application or executable 66 for performing color analysis may include several modules. For example, a separate module 68 is responsible to receive the information from a scanner or other input device 24 regarding the coloring of the body color centers of an individual. Alternatively, the module 68 may receive information regarding the coloring of an inanimate object.

As with module 68, module 70 determines, based on the actual color scheme of an individual's person what the appropriate colors are for cosmetics, clothing, and accessories. Alternatively, the module 70 may determine, based on paint color, carpet color, upholstery, or other inanimate objects, appropriate colors for coordinating features and components of a room or office. The presentation module 72 provides a color palette in a format suitable for review and consultation by a subject. That is, an individual receiving the results of a presentation module 72 or receiving output from a presentation module 72 may receive a printed paper palette identifying various colors by swatches or panels. A subject may go online and view on a computer screen of any particular processor a palette of colors.

For example, a PDA, a cell phone, a computer monitor, or the like may present to a user the color palette. In this way, an individual may simply use a cell phone or PDA to check at any time the color on the screen of the output device 46 against a sweater, a pair of jeans, a shirt, a cosmetic product, or any other particular item or accessory. Likewise, an individual may carry a card containing a printed series of color swatches identifying the particular colors that would be appropriate for cosmetics, clothing, accessories, and the like.

The assessment module 68 is responsible to take inputs and provide an ultimate assessment of an individual subject's coloring. In one embodiment of an apparatus and method in accordance with the invention, the assessment module 68 may include a query module 74. The query module 74 may receive inputs originating with the input devices 24 to identify data corresponding to various physical characteristics.

At this point, the attributes considered most valuable for determining color schemes that match an individual's coloring include skin, hair, and eyes. That is, the general color of skin, the general color of hair, and the general color of the iris of the eye are attributes 78 that may be identified. Each of these attributes 78 of an individual will have a characteristic color. Typically, the iris contains multiple colors. Nevertheless, there is typically one color that represents the more colorful part, whereas other streaks of neutral and dark colors may also be present.

Associated with each attribute 78 is a color 80. Each of the colors 80 may be identified by a number. For example, various schemes of multi-dimensional spaces to define colors have been discussed above. For example, the CMY, sometimes referred to as CMYK and including black, is a system wherein the orthogonal axis of a coordinate system may be used to define a percentage or content of cyan, a percentage or content of magenta, and a percentage or content of yellow.

Similarly, an XYZ color system may be based on the XYZ scheme discussed above. Similarly, an RGB (red, green, blue) system may be used. Likewise, the HTML system is a system that relies on the presentation of colors, which are additive in a computer monitor, and therefore are a version of the RGB color scheme. Likewise, an LAB system could be used as described hereinabove.

Thus, for each attribute 78, a color identifier 80 or color 80 is determined, and given a numerical value according to a numerical scheme for defining color. Thus, for skin, hair, and eyes (SHE), a color 80 or color identifier 80 is determined.

As a practical matter, any system may be used for an input device 24. For example, a scanning device may be used as an input device 24. The scanning device will either use ambient light or provide a light source to illuminate a subject, (SHE one of them, or all of them) and take a reading on the reflective light. In other embodiments, such as for the eyes, a color swatch, chip, card, or the like may be used for a direct comparison by eye, by a person observing and comparing one of the SHE attributes with the color samples. Either system of scanning and illuminating or of simple comparison with color chips or color swatches may be suitable.

Likewise, a mixture may be appropriate. For example, some individuals are leery to have the eyes exposed to light, particularly coherent (laser) light. Accordingly, for eyes, most people may prefer to have the security of using only a color swatch as a comparator, rather than having an actual illumination from a laser light source.

Thus, the query module has the responsibility of gathering the information, presenting queries to an individual, or to the machine, or to a database or record created to contain the information, and then correlating that information. Accordingly, the individual attribute 78 of an individual person will have a color identification 80 associated therewith.

The color identification 80 may be taken according to any color scheme. That is, the colors may input from a device, such as a Pantone scanner. Accordingly, a Pantone scanner will typically provide color numbering schemes corresponding to a color system developed by Pantone. Nevertheless, the color identification 80 may actually rely on the assessment module 68 to manipulate or map the number scheme or the number values according to the number scheme of the scanning or other input device 24 in order to provide a standardized color identifier 80 in accordance with the invention.

Thus, various number schemes exist. They range through various numbers of decimal places, various minimum and maximum values on axes, and the like. Nevertheless, for convenience, it may be preferable to operate in ranges that run from typically zero to one hundred, zero to one, or the like. Thus, the color identifier 80 may actually include both color identifiers by other schemes, such as a Pantone, RGB, HTML, CMY, CMYK, XYZ, or the like as well as a map value of a unique system in accordance with the invention.

Indeed, the values for color may be converted to or from a Pantone scale, an RGB scale, an HTML scale, an LAB scale, an XYZ scale, or a CMY scale, or the like. That is, for example, the color families selected in accordance with the invention, as detailed below, may be scaled from zero to one, or from zero to one hundred. Likewise, the ranges of colors could be scaled from minus one to one, or minus one hundred to one hundred. Nevertheless, recognizing that the color families selected in accordance with the invention are themselves not the full ranges of colors in the three-dimensional color coordinate space, an apparatus and method in accordance with the invention may map the actual color system of the invention, and the color scheme of an individual back to a standardized color scheme of any make. Thus, those values can be recorded, or converted to or from the multi-dimensional color scheme of any standardized system.

The values of the colors of an individual may then be input into a process for providing a color palette. In one embodiment of an apparatus and method in accordance with the invention, the skin and hair may be considered primary, and a closest match may be selected. The closest match in the color scheme may be returned for each of the skin and hair. If no color match is found, then the system may elect to return no color for skin, hair, or both.

The system next may convert the eye color to the standardized color scheme used by the standardized system relied upon. For example, if one is going to rely on the LAB system, the XYZ system, the RGB system, or the Pantone system, then the value of the eye color number may be converted to an equivalent in that standardized system. If no output is received from the original matching of skin and hair, then the individual may be reevaluated, or the system may be reevaluated to see whether the full range of necessary colors is included in each color family.

In one embodiment, the assessment module 68 may include a property identifier 82. That is, the assessment module 68, and typically the query modules 74 therein, may provide one or more numbers, letters, or characters providing a property identifier 82. A property identifier 80 may be ascribed to each color.

Properties 82 have a unique sensibility in dealing with human beings. That is, people have been described for centuries as fair or light, dark, ruddy, dusty, and the like. These qualitative characterizations may or may not be well understood. They are typically not highly objective and measurable. How dark is swarthy, and is swarthy an inclusion of both dark complexion and dark hair, or can a person who has dark hair and pale complexion be considered swarthy? Likewise, various schemes, such as the "four seasons" have been used to characterize the coloring of people in terms of the colors of nature. That is, the seasons have color schemes that people accustom themselves to. Thus, some individuals have sought to characterize human color according to the combination of colors that occur within the four seasons of the calendar. However, the actual coloring of human beings is different from the coloring of plants, the world around us, and other color schemes of inanimate objects.

For example, one may think of colors in terms of temperature, even though they do not actually have temperatures. For example, colors that have an extra measure of yellow tend to be associated with warmth, the sun, fire, and the like. Similarly, colors that contain more blue may typically be associated with sky, night, rock, and things that are cold.

Thus, a property identifier 82 or a property 82 of a particular color 80 may include characteristics that people can relate to. Nevertheless, the properties 82 are determined by experts in color valuation for human beings. Accordingly, the property identification 82 or properties 82 of the query module 74 are programmed, in an embodiment in accordance with the invention, using expert knowledge, captured in a selection of ranges of color schemes and selections of color families, as well as proportions of particular constituent colors in order to characterize various colors 80 by properties 82. More will be discussed on this hereinafter.

The determination module 76 has responsibility for accumulating and evaluating (processing) data corresponding to the various attributes 78 of a subject. For example, the determination module 76 may collect data from skin, hair, eyes, two of the foregoing, or all of the foregoing.

One output of the determination module 76 is a color class assessment 84. The color class assessment 84 characterizes the subject into a color class. In certain embodiments, the determination module 76 may actually classify each of the colors 80 corresponding to a color center (skin, hair, eyes) of an individual into an individual color class.

Once all the color inputs for an individual are provided for skin, hair, and eyes, the system may check for contrasting colors. That is, if one of the three (skin, hair, eyes) is particularly disparate from the others, then the color scheme may be flagged as contrasting. Otherwise, so long as the three colors are within the appropriate ranges (e.g. within the proper highest, center, or lowest third of the color families for each) then the three colors may be averaged or added. Accordingly, a value is next output that characterizes the subject's coloring according to a color class, such as light, true, vivid, or contrasting.

Typically, a single color class assessment 84 may correspond to the entire color scheme of an individual subject. However, with contrasting individuals, wide disparities in the lightness or darkness of hair relative to skin, eyes relative to hair, or the like may demonstrate that the skin, hair, and eyes must be or should be best matched by being treated separately. Nevertheless, in most situations, where the color values of skin, hair, and eyes are more coherent with one another, the actual numerical values of those colors may be averaged, or combined in a weighted average in a manner to provide a color class assessment 84 that characterizes the individual.

In one embodiment, color class assessments 84 may take on characterizations such as light, indicating consistently light coloring. Another assessment 84 may provide for true coloring indicating a more-or-less centralized coloring scheme. Likewise, for someone who has consistently dark coloring in skin, hair, and eyes, a vivid color characterization may be output. For people who have highly contrasting color, where two of the basic attributes 78 are at one extreme with another attribute 78, individual treatment of each key attribute 78 may be required.

Based on the determination module 76 providing an output on a color class assessment 84, an association module 70 may use that input. That is, the association module 70 may take the color class assessment output 84 and treat it as an input in order to match colors. The association module 70 may then output a palette of colors identifying various colors within color families selected to be appropriate for that individual's coloring.

That is, an individual has certain coloring in skin, hair, and eyes. However, the objective of selecting cosmetics, accessories, and clothing is to provide a flattering appearance, whether those colors worn are opposite (complementary), or the same as the colors of the individual. For example, a particular scarf may contain a color that matches an eye color, and thus "brings out" the eye color. By contrast, typically for vivid persons, bright colors vary different from the existing coloring of the subject. They are instead used to accent by their opposition to the existing coloring of an individual.

In one embodiment, the association module 70 uses an averaging mechanism to average the values of the colors of the skin, hair, and eyes. Typically, if all those colors are within a "light" range of color, then the person may be characterized as light. If those colors are within the "true" range, then the individual may be characterized as true. If the average or mean of the SHE colors is in the darker range, then the individual may be characterized as vivid.

Typically, a simple averaging mechanism for the color class assessment 84 may quickly and effectively characterize an individual as light, true, or vivid. Typically, the determination module 76 does the assessment and the color class determination or color class assessment 84 for the colors of an individual's skin, hair, eyes, one or more of the foregoing, or all of the foregoing.

However, the association module 70 has responsibility for matching the color class matches 86 of compatible colors. Typically, colors for an individual who has clearly a light, true, or vivid coloring scheme, are colors that tend to match the individual's coloring. Nevertheless, people who are vivid tend to have darker features, and thus can actually benefit by wearing vivid colors that are complementary or opposite to their existing coloring. Likewise, individuals who have contrasting coloring appear to benefit more from colors matched to the individual hair color, or eye color, or skin color, and not to all of them together, since all of them do not match. Accordingly, the association module 70 has the responsibility to provide or associate, according to the expert knowledge programmed into the association module 70, the matching colors that will best suit the coloring of an individual.

In one embodiment of an apparatus and method in accordance with the invention, color class matching 86 is done first, an individual attribute matching 88 is then done. In the case of contrasting individuals, individual attributes must be matched by color class matching 86, and the output of attribute matching colors 88 is the only matching. By contrast, people who are not contrasting, but are clearly either light, true, or vivid, the overall coloring scheme may be matched, while individual attributes may also be matched. Thus, one may wear jewelry that highlights the eyes, whereas matching shoes to eyes is not necessarily an appropriate way to draw out the color of the eyes.

In certain embodiments, each of the attributes 78 may be matched 88, after which the overall color class matching 86 may be done by the association module 70. In another embodiment, the basic numbers that identify the color scheme of the individual, may be averaged into a single number to determine whether an individual is light, true, or vivid. Depending on that class, then the individual may be characterized, and a palette may be created for that individual.

In one embodiment, the color schemes may be provided on a scale of zero to one hundred, where zero is the lightest color in the color range or class, and one hundred is the darkest color in the color class. One may think of zero as the lightest degree of saturation, and one hundred as the highest degree of saturation on the colors in the color class. Color classes are selected by expert analysis and knowledge. Thus, the basic colors for an individual's color class matching 86 may be somewhere near the center of the class.

For example, with the light color class ranging to about the thirty percent mark, a value of eleven percent has been found appropriate for designation of matching colors for an individual who has light coloring. Similarly, whereas the true color range runs from about one-third to about two-thirds of the overall saturation range, half way between the range may be an appropriate location, and forty-seven percent or a value of forty-seven on a scale of zero to one hundred has been found an appropriate color saturation level for identifying the colors for color class matching 86 for an individual by the associate module 70. Vivid creates a different situation. That is, although an individual may be considered vivid if their color scheme is on the upper third of a saturation level, from lightest to darkest, the color class matching 86 will typically return a value of fully saturated color, or the one hundred mark or one hundred percent mark on the scale.

Regardless of whether an individual is contrasting or not, attribute matching 88 may be appropriate. Accordingly, the association module 70 may produce for an individual attribute matching 88 of colors that will flatter each of the skin, hair, and eye colors of an individual. In the situation of a person who is contrasting, color class matching 86 for the entire overall look of the individual is typically inappropriate. That is, averaging very light and very dark values in a person's overall valuation of their color scheme will typically provide a mid-range that does not flatter any aspect of the individual's coloring. Thus, in such an event, attribute matching 88 is the preferred and only process for matching the coloring of that individual. That is, the individual's skin, hair, and eyes, will have attribute matching 88 in order to select colors that will flatter those colors individually.

The presentation module 72 is responsible for presenting a color palette of appropriate colors to a user. In one embodiment, a preliminary step may provide a presentation of a mid-range color for the individual, in each color class. If the individual, or the individual in consultation with a color consultant is satisfied that the color is appropriate, then the color may be accepted, and a full palette may output. By contrast, if the individual determines, or the consultation with the individual determines that the colors returned in each color class do not look appropriate, then the individual may be rescanned and a new analysis may be undertaken.

Once an individual has accepted the color analysis, then a full palette of colors may be provided in a suitable format. For example, a value conversion module 90 in the presentation module 72 may convert the numerical values of the color class matching 86, the attribute matching 88, or both, into numerical values in the schemes of the display mechanism used by the subject.

For example, in printing, typically a CMYK system will be used. Thus, the numerical value in the "color space" or three-dimensional vector space in which the color numbers are defined, the numerical scheme needs to be matched into the numerical scheme of an output system. Accordingly, the value conversion module 90 may be responsible to convert from the numerical scheme in accordance with the invention into an RGB scheme for presentation on a computer screen or a telephone image system or PDA. Likewise, a CMY or CMYK conversion may be necessary from the original numbers in order to print out a hard copy of color swatches to output a color palette. Likewise, an individual may prefer to have a web page output, and an HTML scheme may be required. If an individual wants to return to a Pantone book of colors, then the numerical scheme may be converted into a Pantone scheme.

Accordingly, a display module 92 may be any display system for displaying the output. For example, the display module 92 may be a driver for a computer monitor. Likewise, the display module may be a driver for a printer. In other embodiments, the display module 92 may actually be a simple executable for sending to an output device a proper set of signals in order to display the color scheme in the palette to an individual.

Figure 5:
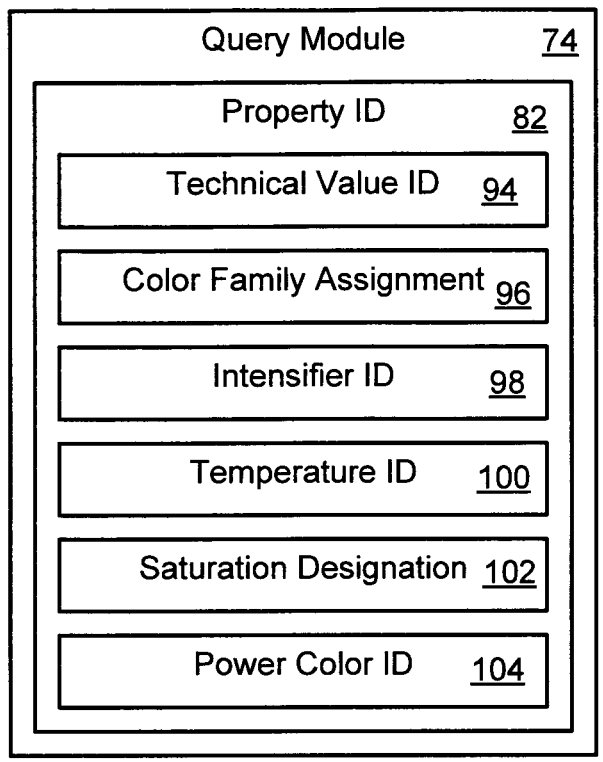
FIG. 5 is a block diagram detailing one embodiment of the query module of FIG. 4.

Referring to FIG. 5, the query module 74 may include a property module 82 or a property identification module 82. For example, the property module 82 may include a technical value module 94 that takes the input value from an input device 24 and converts into a numerical or technical value in accordance with the invention. For example, only certain ranges of colors are not useful. By contrast, wide ranges of colors exist in various systems, including the Pantone books. Thus, a technical value that is scaled between zero and one, or between zero and one hundred may be selected for any color family or color range and mapped by the technical value module 94 from the original inputs.

Thus, the technical value module 94 maps, in one embodiment, the color identification 80 corresponding to the scanned attribute, and determines a constituent color value or simply a color value corresponding to that attribute, in a system understood, established, transportable, and recognized. For example, translation into an LAB, RGB, CMY, CMYK, etc. system will provide a portability and universality for the color ID 80 determined for an attribute (skin, hair, eyes) of a subject.

Color families are known for various attributes. As described hereinabove, skin, hair, and eyes have particular color families that they tend to run in. Accordingly, the technical value module 94 outputs a technical value of the color ID 80 in a standardized color scheme. The color families are determined by expert analysis. That is, of all the colors that can be used, the darkest and lightest typically encountered or likely to be encountered in a subject may be selected by an expert in fashion or human coloring. This expertise can be captured by spectral analysis to identify the precise color combination in the three-dimensional color space.

The color family assignment module 96 identifies which color family that number will fall into. Each "color family" can be defined as a range of colors along each axis in a three-dimensional color scheme, from the lightest to the darkest, where the end points of such a range are determined by experience and expertise. One may think of the lightest color in the family as valued at zero, and darkest at one hundred. Thus the range can be zero to one hundred.

In one embodiment of an apparatus and method in accordance with the invention, the color families that can be selected are red, red-orange, orange, yellow-orange, yellow, yellow-green, green, blue-green, blue, blue-violet, violet, and red-violet. Other color families provided may include pink, gray, tan, metals, turquoise, white, black, navy, peach, and brown.

These color families do not necessarily correspond to any other particular color scheme. Moreover, human coloring, like that in other natural subjects, is a subtle combination of constituent colors. The color family thus depends not only on the value of the color, but also on which attribute that color applies to.

For example, not all attributes can fall within all color ranges. In one embodiment, each of the attributes (S, H, E) may have its own set of palettes or ranges to which a color value 80 or color identification 80 may be compared. Thus, a color of an attribute will not be compared to all the possible colors, nor even to all possible color families, but typically only to those to color families that are candidates for such an attribute. Thus, eyes, and the colors of eyes, are only compared with color ranges or color families that are candidates for eyes. Similarly for skin and hair.

While not every color in the color families corresponds to skin, or to hair, or to eyes, those colors typically expected in skin coloring include red, red-orange, orange, yellow-orange, yellow, yellow-green, pink, metals, white, and peach. Colors typically found in hair include red, red-orange, orange, yellow-orange, yellow, green, tan, white, black, and brown. Colors typically found in eyes include red, yellow-green, green, blue-green, blue, blue-violet, violet, red-violet, turquoise, black, navy, and brown.

This correspondence of color families in the color family assignment module 96 to particular attributes (skin, hair, eyes) assists in avoiding ambiguities. For example, the color of blue eyes and the color of blue in dark hair are not only rare between individuals, but also are not the same color concentrations of blue. By having color families corresponding to particular attributes, ambiguities may be reduced or otherwise handled.

The intensifier module 98 provides an intensifier identification identified as opposing a color occurring in a subject. Thus, the intensifier module 98 relies primarily on finding an exact opposite on "the color wheel." The intensifier module 98 deals principally with hue. That is, an opposite hue provides an intensifier. The intensifier may represent a color that will intensify the appearance of the existing coloring of a subject.

Thus, a color of eyes, skin, or hair may be highlighted by a completely contrasting or complementary color from the opposite side of the color wheel of hues. Nevertheless, saturation of the color will still correspond to that of the existing color of the subject. Thus, a tinted, shaded, or toned color of an attribute of a subject is typically matched by an opposing or complementary color having the same degree of tint, tone, or shade as the saturation level of that color to be worn.

The temperature identification module 100 or temperature module 100 is responsible to determine the temperature of a color. This module 100 identifies a temperature corresponding to a color of an attribute of a subject. The temperature is not actually and literally identified, but the concept of temperature as defined between cool, neutral, and warm is determined by the temperature module 100.

In one embodiment of an apparatus and method in accordance with the invention, the temperature of a color of an attribute of a user or subject may be determined. Temperature may be defined as the absolute or relative value of yellow with respect to blue, or the value of blue with respect to yellow present in a particular color. Ranges of colors having predominantly blue (over yellow) will be cool. Colors having more yellow than blue will tend to be characterized as warm. Colors in which the yellow and blue are more balanced will typically result in a neutral temperature designation. The temperature may include a temperature coefficient indicating a relative temperature.

Within the colors of any of the color families identified above, each may be cool, or warm. Thus, in one embodiment of an apparatus and method in accordance with the invention, a value of the lightest cool color, ranging up to the darkest cool color, may be stored in the database 64. Similarly, for that same color family, the lightest warm color may be stored, up through the darkest of that warm color.

Various numerical schemes have been tried and found suitable for defining the temperature, or warmth versus coolness, of a particular color. In one embodiment, LAB values may be used.

For example, if a ratio of the A value to B value is taken with the smaller of the two values on top and the lower as the denominator, then a coefficient may result from that division. If the B value ends up on top, then a value between zero and fourteen would indicate a warm color, with neutral ranging in the fifteen to thirty range. Anything over thirty-one is normally considered cool. By contrast, if the A value is on top, then the range of zero to fourteen would be considered cool, with fifteen to thirty being neutral, and anything over thirty-one representing a warm color.

The property module 82 may also include a saturation designation module 102. Saturation designation refers to the degree of tint, tone, or shade. Typically, only one designation is required. Tint corresponds to white, tone corresponds to gray, and shade corresponds to black additions to a hue. A fully saturated hue may have no white, gray, or black added to it. Saturation is determined by evaluating a color to determine the amount of white, black, or both that exists beyond the content of the base hue. Saturation may be represented by a number, which number represents the amount of black and white, if any, added to the hue.

For example, in an LAB system, the L value corresponds to the "lightness" or the "darkness" component. Lightness corresponds to an addition of white, while darkness corresponds to a black addition. Adding both provides a mixture of tone. Accordingly, the value of any color may be broken down to its constituent components and thus evaluated by the saturation designation module 102 to determine the degree of saturation and darkness or lightness of the color.

A power color module 104 or power color identification module 104 establishes the more intense version of a color corresponding to a user. Typically, it has been found that the best power colors are those which tend to bring out eye color. Accordingly, a fully saturated hue corresponding to the color of the eye attribute is the preferred power color. Thus, the power color module 104 may use the output of the saturation designation module 102. The module 104 determines the fully saturated color in the absence of white or black. That color corresponds to the power color for an individual.

Thus, the property identification module 82 may identify the values in objective numbers that correspond to each of the key colors found through experience and expertise in a fashion and color analysis expert system. The experience of the expert has been input into algorithms and numbers to select the color families and provide for identification of intensifiers, temperatures, saturations, and power colors.

Figure 6:
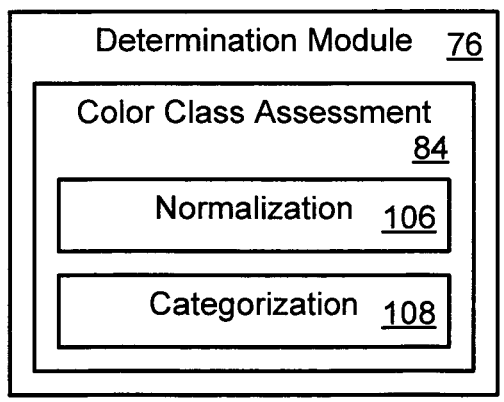
FIG. 6 is a block diagram detailing one embodiment of the determination module of FIG. 4.

Referring to FIG. 6, a determination module 76 may include a color class assessment module 84. The responsibility of the color class assessment module 84 is to determine the color class for the combination of the attributes or the colors of the attributes of a particular subject.

For subjects (e.g. persons) having values for all of the characteristic attributes (e.g. skin, hair, eyes) falling within either a single category (light, true, vivid) or within adjacent categories, or within all three categories, an average may be provided in a normalization module 106.

However, a unique situation arises if two of the three key attributes have values that are separated from the remaining attribute by a full category. For example, two attributes light and one vivid, or two attributes vivid and one light provide a contrasting color scheme. In this situation, the normalization module 106 treats each color, that is each attribute, individually, and does not average them. Thus, color schemes will be returned to a contrasting individual that will correspond to eyes, skin, and hair, not to a generalized category of color.

In certain embodiments, normalization modules 106 may be programmed to use a mean, an average, a weighted average, or other combination of colors. In one embodiment, simple averages have been found acceptable. Nevertheless, depending on what color system is used, the normalization module 106 may be called upon to do more manipulation of the actual numbers. For example, in one embodiment, a simple LAB system could be used, without any proprietary color scheme, in order to determine color class assessment. However, this may require substantially more complexity.

In one embodiment, the color class assessment module 84 may rely on the normalization module 106 to determine whether there is a disparate color scheme indicating contrasting coloring in a subject. In other embodiments, this evaluation may be conducted before normalization.

Regardless, a categorization module 108 determines a category for a particular subject. Based on the expert evaluation of the color scheme for an individual, the individual may be characterized as falling within a predefined category from which a color palette known to be compatible with the person's existing coloring may be selected.

In one embodiment of an apparatus and method in accordance with the invention, colors of human subjects are defined as light, true, or vivid. "Light" indicates that the coloring of the individual is light. "True" means that the coloring of an individual is in a range that does not have excessive darkness or lightness. The third range of coloring is called "vivid," because the coloring is such that vivid colors may be worn. Typically, the output of the categorization module 108 is simply a determination of whether or not an individual falls within one of the predefined categories.

Typically, one may think of a light coloring as that associated with a very blonde, such as a Scandinavian coloring. Thus, pale hair, pale eyebrows, pale skin, and the like would characterize a subject as light. Since all colors may be added together for eyes, hair, and skin, then a coloring scheme in which all average closely together would be an indicator of the overall coloring scheme of an individual. Dark skin, eyes, and hair correspond to vivid coloring.

If the color scheme of an individual averages to be in about the mid-range, say from about 1/3 to about 2/3 of the overall range of a particular color family, then an individual may be characterized as a true coloring individual. If the average of the values corresponding to skin, hair, and eye colors ranges in the lower portion, say the lower 1/3, of an overall range of color, then an individual may be considered light. If the average value of the colors of skin, hair, and eyes for an individual average in a range in the upper range (e.g. one-third) of the overall scale of a color family, then one may consider that person to be a vivid individual.

Although the boundaries are subject to subjective expert decisions, one may divide the overall range of colors in a color family between those of the darker colors corresponding to vivid, the lighter colors corresponding to light, and the central colors corresponding to true.

In one embodiment, color classes may be scaled from lightest to darkest on a scale of zero to one or zero to one hundred. Although boundaries are not absolute, a region for boundaries may be found at about thirty-two percent, and about sixty-three percent. These are approximately the one-third and two-thirds of maximum darkness. That is, the scale may assign the very first hue in a family a value of zero, and the darkest hue in that family a value of one hundred. By this scale, the approximate boundary between light and true is at about one-third of the way, and in one embodiment, 31.25 percent. Likewise, the boundary between true and vivid is at about the two-thirds point, and in one embodiment is at 62.5 percent of the one hundred percent.

A unique characteristic arises when an individual scans as a "contrasting" person. That is, for example, some individuals have very disparate coloring. For example, they may have very light hair, and yet a dark complexion. Others may have very dark hair, and a light complexion. Likewise, eye color may be very dark or very light relative to either skin or hair color. Such a person, is considered "contrasting." Through expert analysis and experience, it has been determined that such an individual is best served by not averaging the various colors, but by a special treatment. Colors for such individuals are best selected by either highlighting an outlier, or by ignoring the outlier. Averaging has not been found to be as satisfactory. Thus, dark hair and pale skin might average improperly to assign to a person a true coloring, which is actually not true.

In certain embodiments, an individual may be apprised of the fact that they tend to be on a border between two categories. For example, if someone is on a borderline between light and true, then no problem exists, since a color palette established for them may be designed specifically for their coloring. Nevertheless, to know that this categorization exists is, or may be, considered valuable information to the subject.

Figure 7:
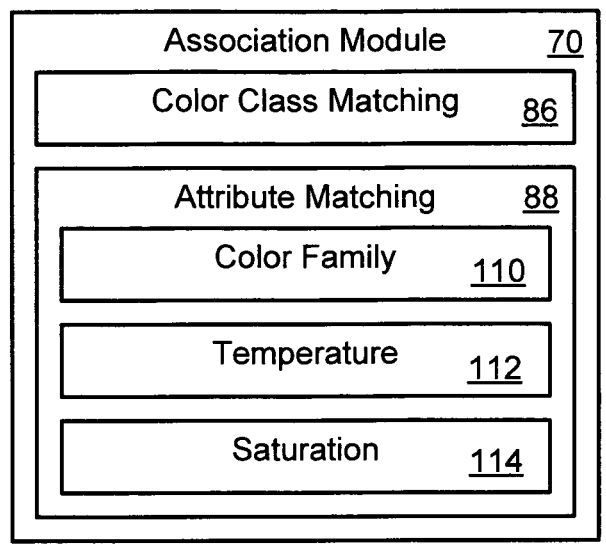
FIG. 7 is a block diagram illustrating an exemplary embodiment of the association module of FIG. 4.

Referring to FIG. 7, the association module 70 may typically include not only a color class matching module 86, described hereinabove, but also an attribute matching module 88. The attribute matching module 88 may include a color family module 110, a temperature module 112, and a saturation module 114.

In one embodiment, a color family module 110 may assign color families as described hereinabove. In one embodiment, the outputs of the color family module 110 may actually be those of the color family assignment 96. However, typically, the output of the color family module 110 is narrower because it includes the evaluation for color class matching 86. Likewise, the concept of a contrasting coloring for a person may require that the color family module 110 return several color families, corresponding to different attributes of the person. Meanwhile, these color family selections will also be narrowed according to the color class matching each of those values of attributes of the subject.

The temperature module 112 may be responsible to return temperature values corresponding to the color family. Temperatures may be characterized as cool, neutral, or warm as described herein. However, it has been found suitable in most instances to return not just a temperature corresponding to the color family of an individual overall, but to return temperature values corresponding to each of the attributes of the subject. Thus, the temperature module 112 typically will rely on the values of all the measured attributes, rather than the averaged or other weighted average characterization of the combination of attributes.

Of course, for the contrasting individual, such functions as the determination of temperature designation are typically always applied to each attribute individually.

The saturation module 114, like the temperature module 112 may return a saturation value for the color family or the color combination for an individual. However, it has been found more satisfactory to return saturation values for each of the attributes of the subject. Thus, the saturation module 114 typically returns a saturation value matching the hue as well as the value of the tint, tone, or shade (if any) corresponding to each of the attributes of the subject.

As a practical matter, saturation may be evaluated by the saturation module 114 by any of several methods. If a sufficiently large table of coloring is stored in the database 64, then a match may simply be made for the hue, and the degree of light or dark (tint or shade) that has been added to that hue in order to obtain the color identified.

Nevertheless, some display systems are inadequate, or necessarily limited in the number of colors that can be displayed. Similarly, the human eye has limitations in its ability to detect variations of color. Moreover, with an automated numerical scheme for the colors, selecting a saturation level may be automated simply from the color numbers and a knowledge of the overall scheme of a three-dimensional color space.

Nevertheless, in one presently suitable embodiment, it has been found that it is better to deal with a substantially reduced subset of the overall color space available in any color scheme. Accordingly, all values in the color space are not available. Accordingly, it may be preferable to have a simplified system for determining saturation.

For example, in one embodiment, an individual may scan in a color, or take a color from the database that has been scanned, and then search for its equivalent in a color scheme such as an RGB or LAB system. Thus, obtaining values for each of the constituent colors or other components of color, one may then input those components to reproduce the original scanned color.

However, typically the numbers returned will be somewhat off, and thus forming a color that does not actually match the scanned color. Accordingly, one may modify the color of the new swatch that was based on the numbers for the color detected. These constituent numbers may then be calibrated and the calibration factor may be used to adjust combinations of the constituent colors thereafter.

Figure 8:
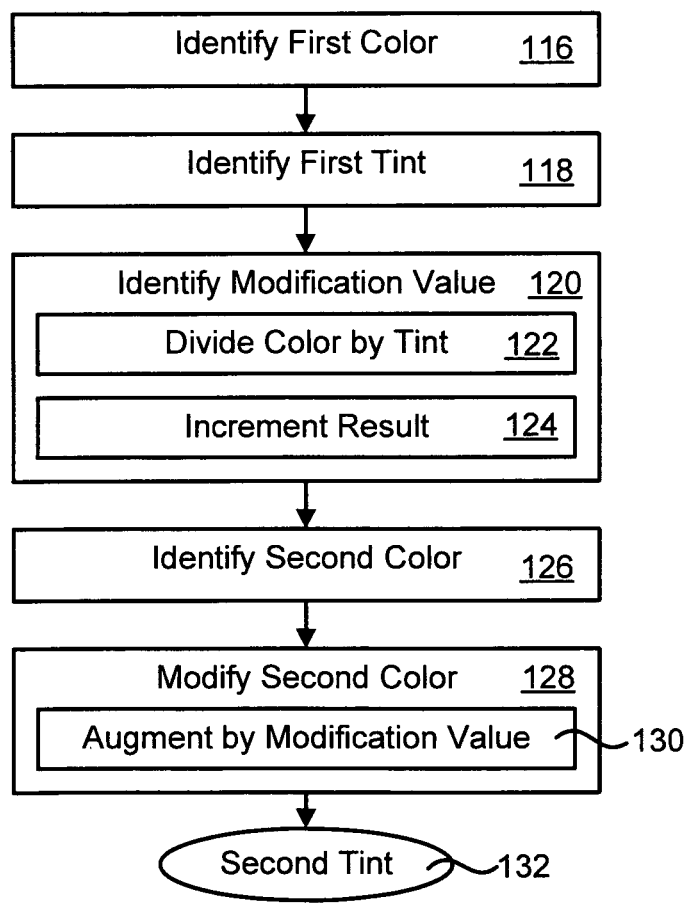
FIG. 8 is a flow chart depicting one method for providing a color tint, tone or shade in accordance with certain embodiments of the present invention.

Referring to FIG. 8, one example of a method for executing the saturation module 114 functions may be seen. For example, a first step 116 may include identifying a first color. Typically this is the color scanned. A following step may identify 118 a first tint. Identifying the first tint may occur by as a practical matter. Identifying 116 the first color may involve identifying the constituent components, and their identifying numbers in order to reconstruct or to identify in the color scheme the color.

However, in identifying 118 a first tint, the constituent numbers from the step 116 may be re-input to provide a new swatch of color. Typically, this swatch of color will not actually match the original. Accordingly, the second swatch may thereby be adjusted by adding tint or shade in order to identify the first degree of tint or saturation. Eventually, by a comparison of the computer user, the color provided to the identify step 116 may be matched to the color (e.g. sample, swatch, etc.) that was created for the identify step 118. Once the two samples or swatches have been matched, it will be noted that they will typically contain different sets of numerical values for the constituent colors.

The identification module 120 provides identification of a modification value. Typically, the original color scheme provided by the identification module 116 may have its color numbers each divided by the corresponding color numbers that resulted out of the identification step 118. This ratio provides the variation between the input to the step 116, and the output of the step 118. Thereafter, any color that comes from the original color scheme may be incremented according to the ratio determined by the division step 122.

For example, in one embodiment, one may open a computer application available over the Internet called Easy RGB. This application provides a color wheel one can use to select a hue. A user may then scan an actual color source (e.g. skin, hair, eyes, etc.) to provide a particular color input. Thereupon, one may enter the color coordinates (numbers in the RGB or LAB space) from the hue selected from a color wheel. A user may now open a second instance of the Easy RGB application and enter the numbers from the first instance of the Easy RGB application. One may then adjust the values of the constituent colors of this second instance until this sample matches the hue that was found from the input scan.

Next, a ratio may be found. The division of values from the original hue divided by the color values (RGB values) of the modified or tinted version provides a formula. In one instance, for a value of R=199, G=98, and B=43, a tinted orange from the color wheel resulted in an R=255, G=190, B=121 formula. Dividing the 199 by 255 modified the R, and the G and B were likewise modified. This provided percentages of R=78%, G=52%, and B=36%. Modifying the hue by multiplying its value by 1.78 for R, 1.52 for G, and 1.36 for B provided LAB values needed to properly display the appropriately tinted hue.

Thus, in FIG. 8, identifying a second color in an identification module 126 provides the ability to calibrate as shown in the example. Modifying 128 that second color provides 130 augmented values or augments 130 values corresponding to that constituents of the second color. Out of the ratio between the original first color 116, and the modified second color 128, one may identify a second tint 132 by which the original colors can be adjusted in order to match the tint of the input color.

In one presently contemplated embodiment, identifying 116 a first color is to select the hue that one believes will best match an actual sample. Meanwhile, identifying 118 a first tint identifies the actual measured sample. Accordingly, identifying 120 a modification value one may enter into an application providing a color wheel from which the first color was taken in the step 116, and select the same valued color to then be matched to the tint identified in step 118.

Once the identification step 120 has matched the color or tint from the identify step 118, one has the ratio from the increment step 124 by which the ostensible color 116 varies from the actual measured color 118. Thus, one may take that ratio and mathematically adjust any new color 126 in order to modify 128 it according to the actual color scheme of the subject.

The actual numbers used above are simply one mathematical way to characterize the relative values and significance of the ratios. Various other systems of normalization and calibration can be used so long as the mathematics are clear. Accordingly, any color to be matched to an individual may be produced by creating a second tint 132 modified according to the ratios determined in the process of FIG. 8.

This actually provides a much more precise system for matching colors than the typical computer outputs that most applications will provide on their own. This is the typical result of the limited amount of space that discretization provides. Thus, because computer systems may only provide a limited number of choices, the exact choice may actually never be displayed until a user requests or exactly requires it to be displayed. However, this mechanism of FIG. 8 provides for calibration in order to provide a precise match to the colors corresponding to attributes of a subject.

Another mechanism or term for the mechanism of the system of FIG. 8 is an interpolation process for providing more accurate color definitions.

Figure 9A:
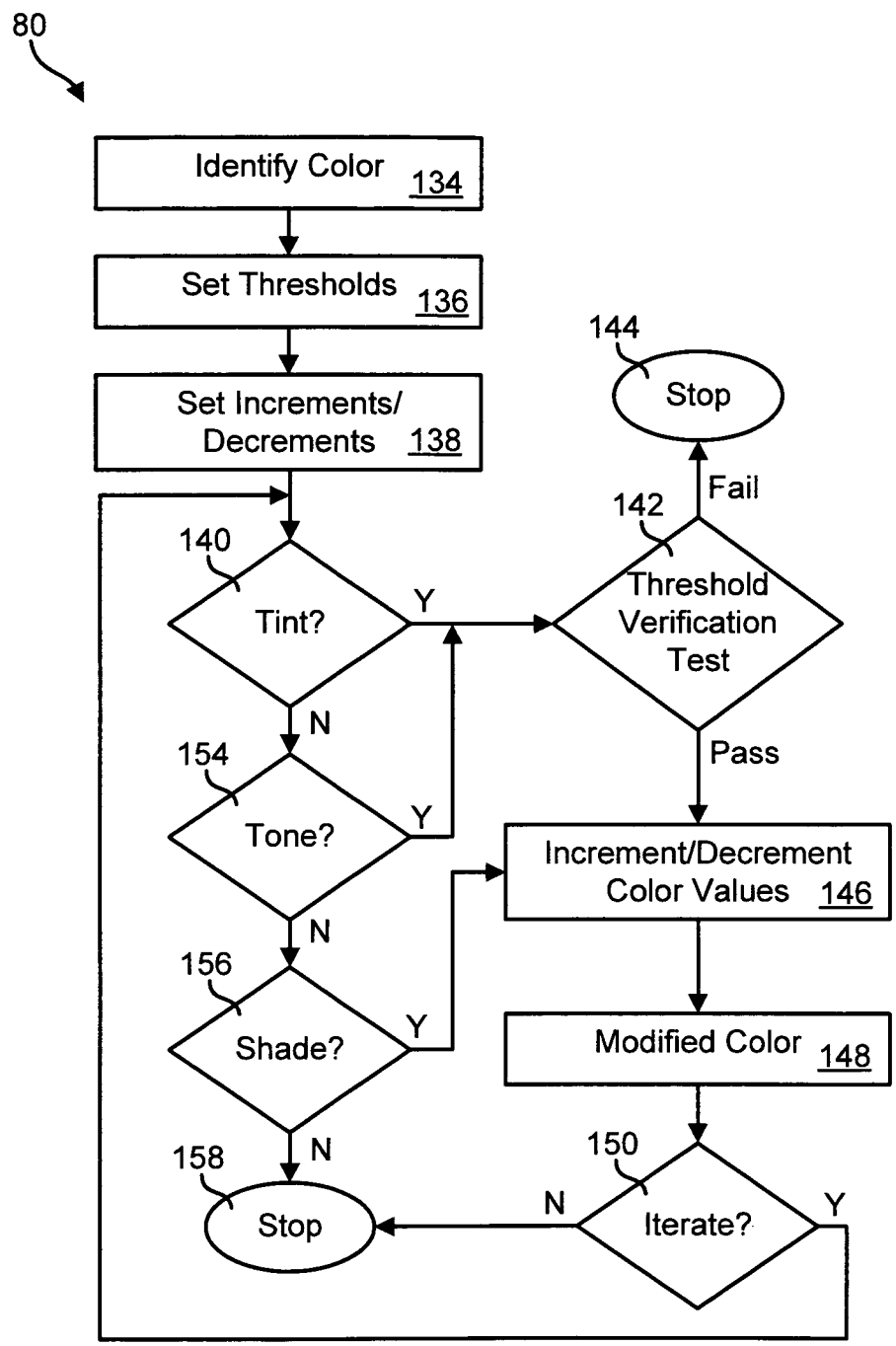
FIG. 9A is a flow chart illustrating an alternative embodiment of the method of FIG. 8.

Referring to FIG. 9*a*, an alternative embodiment of an apparatus and method in accordance with the invention may use a system to work with LAB types of numbers. For example, in one embodiment, an identify step 134 may identify the numerical values for the L, A, and B values of a color selected in an LAB space. To match a tone or tint, the value of the L constituent of the LAB number may be increased by a selected increment. Likewise, an incremental value may be subtracted from the value of A, and a different increment may be subtracted from the value of B.

Since L corresponds to light or dark, A corresponds to the red and green constituent, or red to green constituent, and the B corresponds to the balance between yellow and blue, this modification will provide toning. Likewise, shading involves subtracting a decrement from the L value, subtracting a decrement from the A value, and subtracting a decrement from the B value. To make a tint, the value of the L number may receive an added increment, while the A receives an added increment, and the B receives an added increment. Values that have been found practical and suitable are shown in an example of FIG. 9b.

Continuing to refer to FIG. 9a, setting 136 thresholds may involve limiting the variation permitted in values of the tint. That is, if an original color has a value in the LAB system of greater than seventy-seven, it cannot be effectively tinted. Greater than a value of seventy-seven (nearer to one hundred) tinting is visually ineffective. Similarly, if an L value is greater than eighty-five, it cannot be effectively toned. That is, closer to one hundred the value of L becomes, the darker the color. Accordingly, the human eye cannot necessarily detect any addition of gray in toning.

Corresponding limits may be set in any color system. Nevertheless, it is interesting to observe that when colors are too dark, tint cannot be detected, nor can tone, beyond their threshold values.

Accordingly, the test 140 and the test 154 determine whether or not tint or tone is to be added. If either is desired, then a test 142 must determine whether or not the value of the original color is too dark to accommodate them or to make a difference. If the test 142 determines that the color is too dark, then a stop 144 results, since any tinting or toning will be ineffective.

Meanwhile, if the tint or tone test 140, 154, respectively, can pass the threshold verification test 142, or if shading is desired as determined by the test 156, then a change will occur through an increment or decrement in step 146. Once incremented or decremented, the color values (additions in each of the directions or any of them for the color system used) may then result in a modified color 148.

A test 150 determines whether the color has matched the desired sample. If the modified color 148 provides the proper match to the original input color displayed, then the test 150 determines not to continue iteration, and the system stops 158, outputting the modified color 148. Otherwise, the system may iterate back to identifying to the test 140 to determine whether to add tint, and subsequently tone, shade, etc.

Figure 9B:
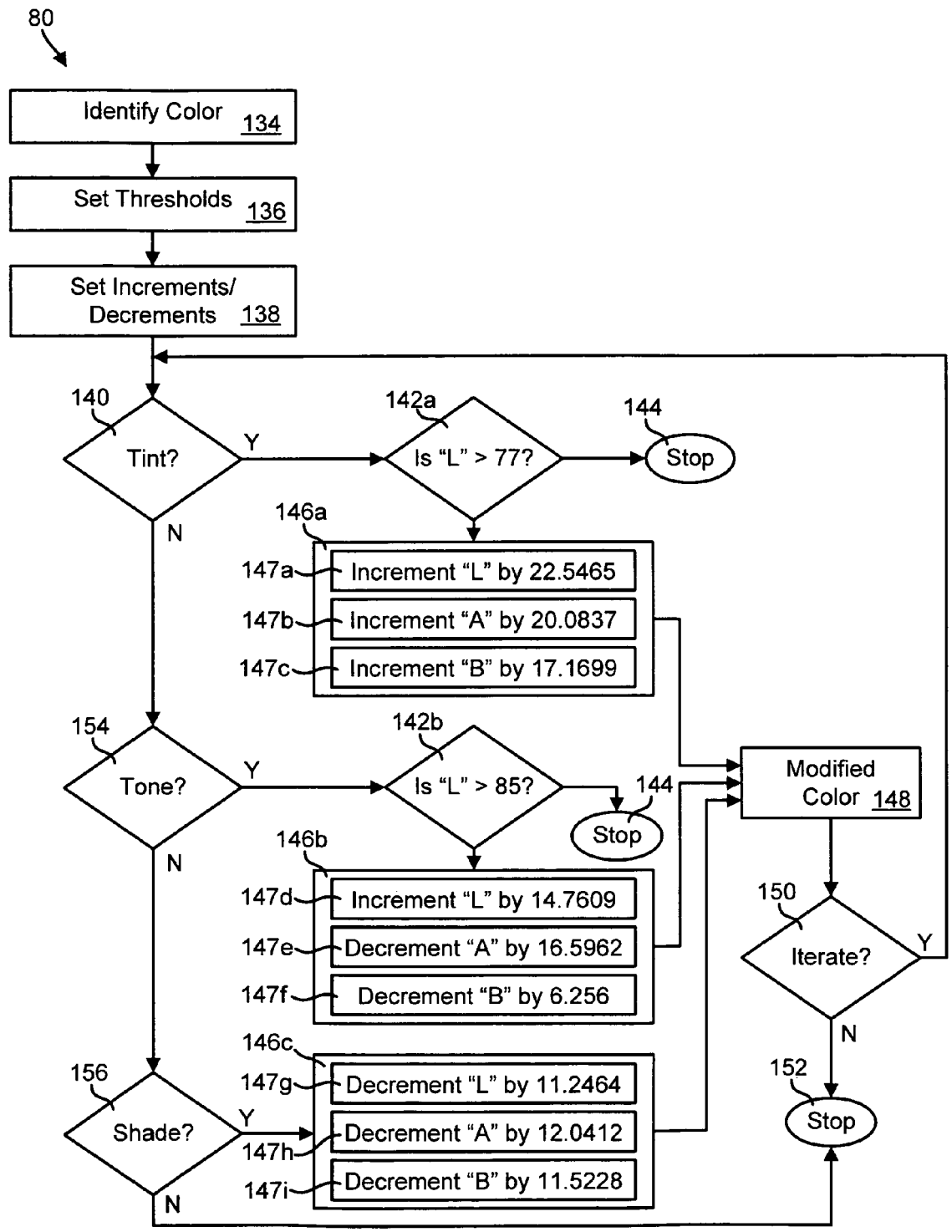
FIG. 9B is a flow chart detailing an exemplary embodiment of the method of FIG. 9A.

Referring to FIG. 9b, the process of FIG. 9a is illustrated with a specific set of numbering corresponding to an LAB type of color space. A similar process may be used with different increments and decrements to provide a color match in a different color space such as RGB, XYZ, HTML, or the like.

Figure 10A:
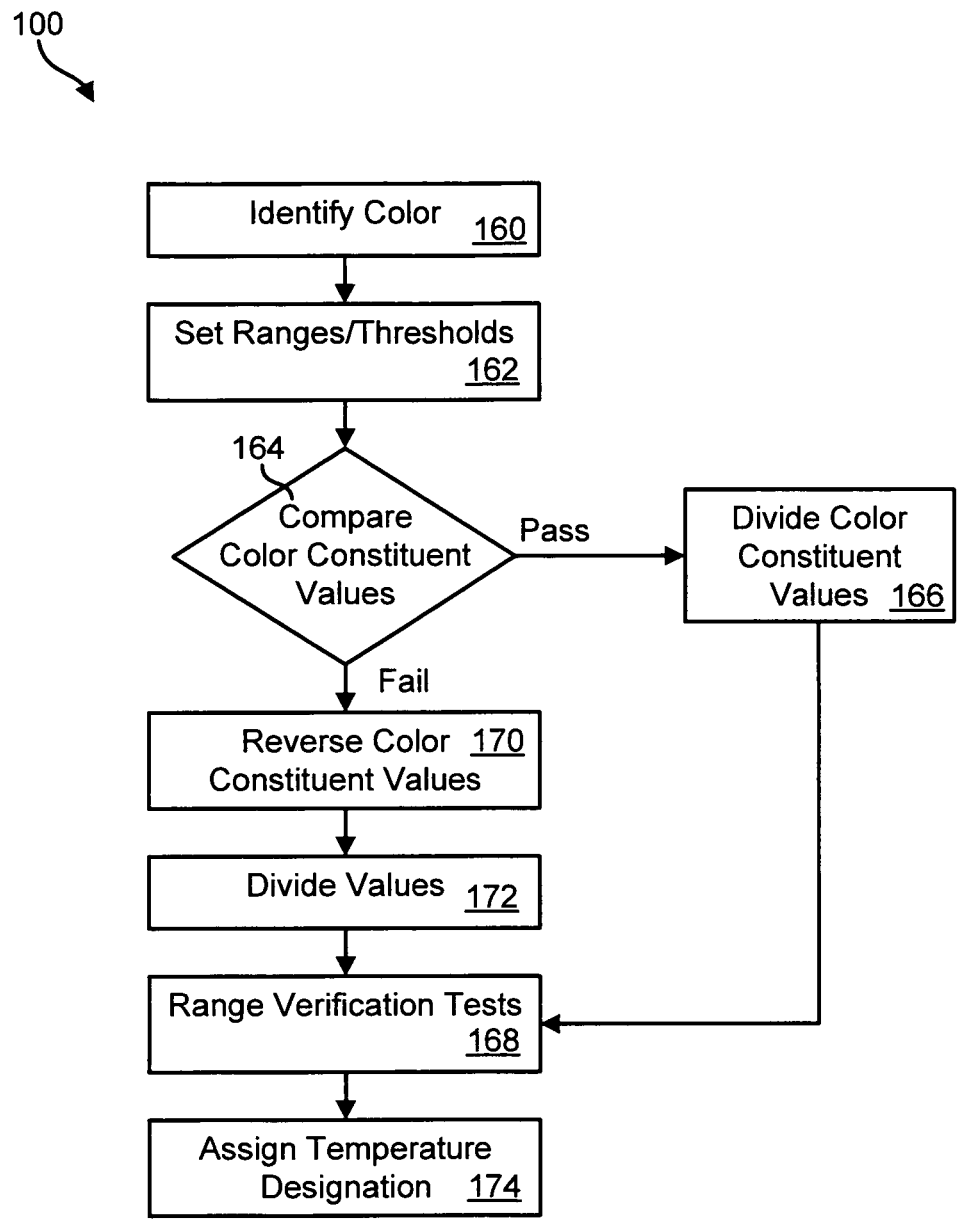
FIG. 10A is a flow chart illustrating one method for determining a color temperature in accordance with certain embodiments of the present invention.
Figure 10B:
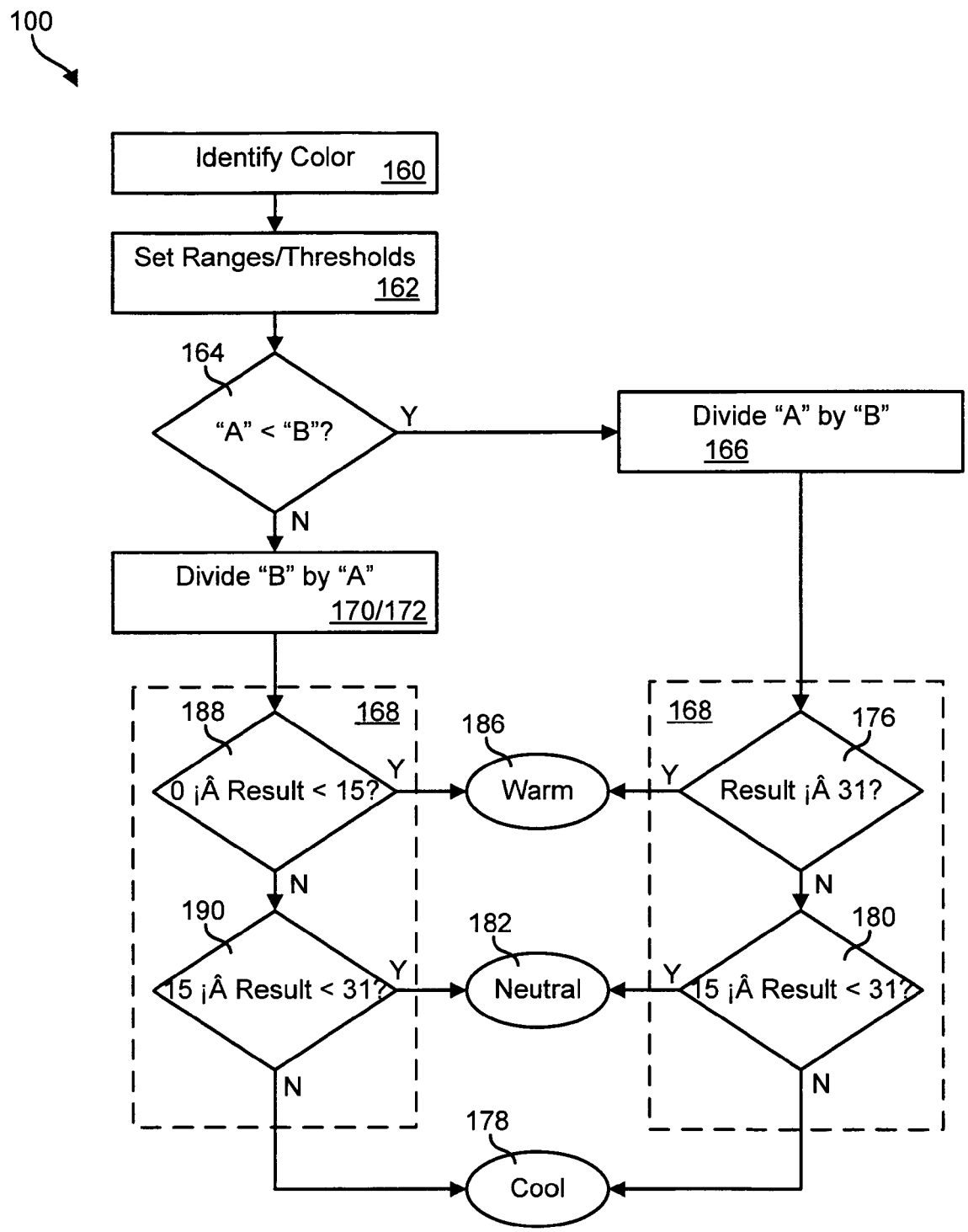
FIG. 10B is a flow chart detailing an exemplary embodiment of the method of FIG. 10A.

Referring to FIGS. 10A-10B, the temperature module 100 may be implemented in a process 100 illustrated in FIGS. 10A, 10B. Just as the process 80 of FIGS. 8, 9A, 9B represent certain embodiments of a programming structure and process for implementing a color identification module 80. The process of FIGS. 10a, 10b represent an implementation of a logical software structure.

The temperature identification module 100 may be implemented by identifying 160 a particular color. Color may be identified by identifying its vector in a particular color space. For example, identifying a color may include identifying the values of the constituent portions of a vector in the color space. In an RGB system, this involves establishing values for R, G, and B (red, green, blue). In an LAB system, this involves setting values for L, A, B (lightness or darkness, red-green balance, and blue-yellow balance, respectively). Typically, the color that is identified 160 is the color scanned and corresponding to an attribute of a subject.

Setting 162 ranges, thresholds, or both may typically be done by injecting the expertise of an expert. For example, in the example of FIG. 10b, and using an LAB color system, certain ranges of values are identified as representing warm, neutral, and cool colors. These represent ranges of ratios. This is but one system. In other color schemes, expert analysis can determine values that appear warm, neutral, or cool. Likewise, where to bound those ranges is largely a matter of experience. Thus, the example of FIG. 10b illustrates the example of one embodiment of those values that have been found to approximate boundaries for warm, neutral, and cool colors.

Thresholds may be set to overlap the boundaries of ranges. That is, a number that is within one range may be allowed to vary and drift into another range, within some threshold limit. Nevertheless, for the sake of clarity, sharp boundaries have been illustrated in the example of FIG. 10b. Nevertheless, some reasonable range, typically on the order of either ten percent of the full range of color value, or on the order of twenty-five percent of any particular range may still be within tolerable taste. Nevertheless, the illustration of FIG. 10b provides an example that has been found to be satisfactory.

The test 164 compares the values of the color constituents corresponding to the color identified 160 by the process 100 to determine which of the major pairs of constituents will dominate. For example, if one considers the A value of a LAB scheme, one is looking at the red-green balance. That is, one may look at red and green on an axis, each one, pure and saturated, representing one extremum. Likewise, the B value represents the balance between yellow and blue. Accordingly, a value of A or a value of B corresponds to the balance between each of the constituents on the axis of extrema.

The test 164 compares the value of A and the value of B in an LAB system. Likewise, a test 164 may consider any comparison that makes sense in another system, such as RGB, CMYK, or the like. If the test 164 provides a pass, then the color constituents may be divided 166 or otherwise processed 166 into a ratio.

In the example of FIG. 10b, the division of constituent values results in a division by the A value into the B value, by a division of the B value into the A value. In the example of FIG. 10b, the test 164 depends on whether or not the value of the red-green balance number exceeds the value of the blue-yellow balance number.

In the embodiment of FIG. 10a, if the comparison of the constituent values is not as established in the setting 162, then reversal of the color constituent values may occur in the step 170. Likewise, the division 172 of the constituent value provides a ratio just as the division 166.

Ultimately, by either direction, the process 100 results in a test 168 to verify the particular range into which the ratio falls. For example, in the illustration of FIG. 10b, the tests 176 and 188 determine that the color constituent ratios indicate a warm color 186. Likewise, the tests 180, 190 indicate that the ratio of constituent colors results in neutral 182 or in a cool decision 178.

One may notice from FIG. 10b, that range verification tests 168 may be done in different ways, depending upon the ratios. However, this simply represents a single mathematical variation to characterize the warm versus cool characteristics of a color. In general, one can identify a color 160, established by expertise in a setting 162 the ranges of particular constituent colors or ration thereof that constitute warm, neutral, and cool, and then compare 164 the constituent values of any applicable parameters established in the setting 162.

Accordingly, the specific numbers and processes of reversing 170 and dividing 168, 172 are peculiar to this particular approach using LAB values. Other manipulations may work as well in order to provide the ratios that determine whether a color in a particular color scheme is cool, neutral, or warm.

Accordingly, the assignment 174 of a temperature designation depends upon the range verification test 168. That is, if yellow tends to dominate over blue, then a temperature designation 174 will typically result in a warmer designation. If blue tends to dominate over yellow, then the assignment 174 may result in a cool designation. If the overall color identified 160 is dominated by neither yellow nor blue, and ends up in a middle range, then the assignment 174 may return a neutral designation for the particular color identified 160. Thus, at its core, the process 100 may include identification 160, setting 162, testing 164, and assigning 174 as its basic steps.

Figure 11:
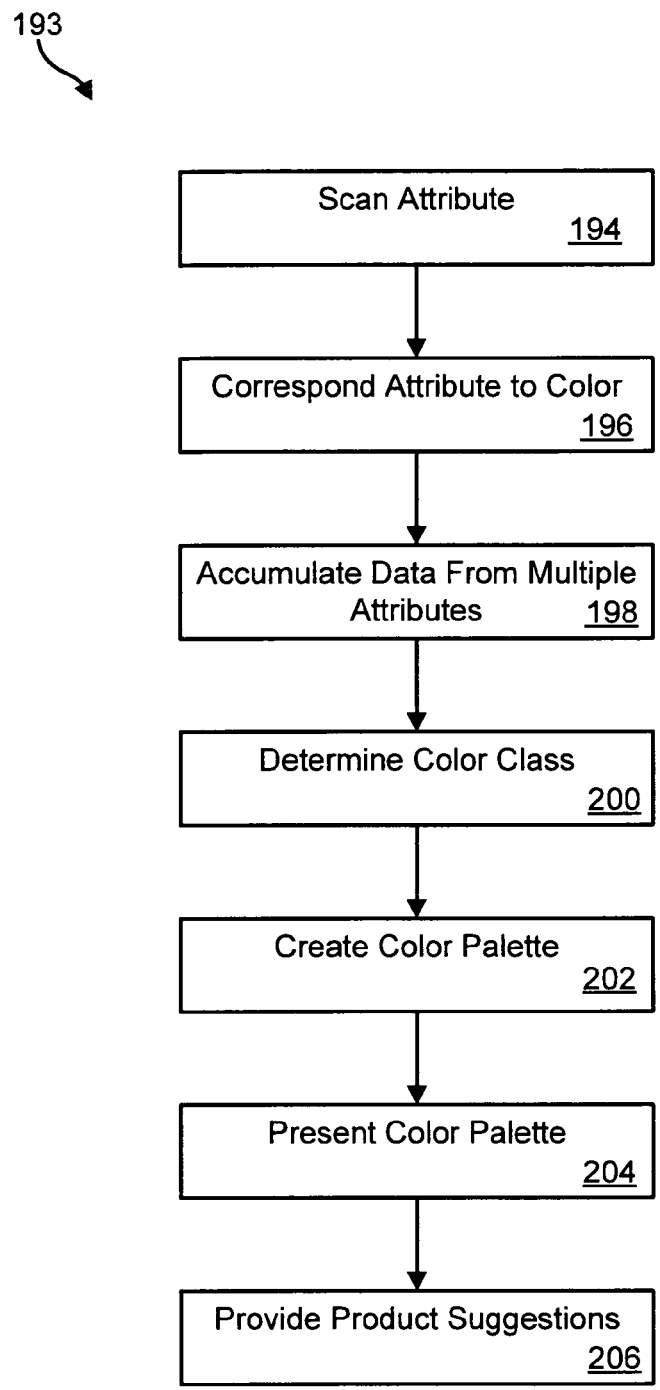
FIG. 11 is a flow chart illustrating a method for automatically generating a customized color palette in accordance with certain embodiments of the present invention.

Referring to FIG. 11, a color analysis process 193 may include a scanning step 194, a "corresponding" step 196, an accumulation step 198, a determination step 200, a creation step 202, and a presentation step 204. Typically, a providing step 206 may occur with a consultant, a sales person, or the subject herself or himself. For example, one objective of most subjects in executing the process 193 is to be able to acquire or otherwise provide suggestions for products that will flatter the coloring of a subject. The providing step 206 may occur by comparing a color swatch against a product in a store. The providing step 206 may result from a sales person selecting and presenting a variety of shades of a cosmetic or of a particular article of clothing in order to match the analysis resulting from the process 193.

In one embodiment of an apparatus and method in accordance with the invention, one process for color valuation includes verifying the correct color of the light source illuminating the subject. Thereafter, the machine may be calibrated. One may think of evaluating the light source and calibrating it to the machine as a single step, or multiple steps.

In another embodiment of an apparatus and method in accordance with the invention, a consultant may set an appointment with a subject. The consultant may collect personal information and enter it into the database for the subject. The background lighting may then be checked and verified to be adequate. That is, background lighting if it is too low may provide improper readings. Likewise, if background lighting is too high, it may provide improper readings. Thus, the background lighting must be within, or should be within, a selected range in order not to overwhelm or inappropriately affect the output of the color scanner.

Referring to FIG. 11, scanning 194 may involve scanning one or more attributes of a subject. In one presently contemplated embodiment, scanning may involve electro-optical scanning of various color centers of the body. For example, skin, hair, and eyes are color centers that are noticed in fashion, and between individuals. Accordingly, scanning 194 may include scanning the skin, hair, and eyes of an individual. In one embodiment, scanning may involve comparison directly of color swatches, color palettes, or other color samples against the coloring of an individual.

Nevertheless, in one embodiment, an electro-optical scanner may pick up reflected light from the skin, hair, or eyes, or any combination thereof. In one embodiment, the skin and hair are scanned by an electro-optical device that provides a color number corresponding to each. Meanwhile, a color swatch is used for the eyes, in order to accommodate customer desires and prejudices.

Having scanned 194 the attributes desired, a system and method in accordance with the invention may correspond 196 the attributes to colors. That is, the hardware, software, or both associated with the input device, or software executing on a server 60, or other processing capability of hardware, software, or both, may provide a correspondence through analysis, calculation, or a lookup table that will correspond a particular color of an attribute to that attribute, and to that subject. Accordingly, a database 64 may have an engine that collects and provides such information. Likewise, the database 64 may store a record that simply corresponds a subject to attributes and colors for each of the attributes.

According to the value of the number associated with the color of the skin, the hair, and the eyes, tables may be compared by mapping the color numbers to an absolute value of color constituents. Accordingly, standardized numbers may be returned for skin, hair and eyes.

If exact matches to the values of SHE entries do not match the database table, the system may search for a closest match based on the skin or hair values first. If no closest match is found, then a consultant may be notified for modification of the system, or may perform a second, more careful scan of the individual.

In one embodiment of a system and method in accordance with the invention, accumulation 198 of data from multiple attributes may occur. In certain circumstances, accumulation 198 may actually involve maintaining separately the different colors of different attributes. By the same token, with other color schemes of individual persons or other subjects, accumulation 198 may include processes such as averaging, weighted averaging, and otherwise establishing relationships that account for the totality of colors and attributes of a subject.

Determining 200 a color class typically involves providing a system of color classes determined by an expert who has established certain classes of colors and identified them by some suggestive or other name that will help users to understand their significance. In one embodiment of a system and method in accordance with the invention, color classes are three. They range through light, true, and vivid, with provision for contrasting as a separate class.

In one embodiment, the most significant digits (typically the first two) of the SHE values may be averaged to determine an overall classification of the subject as light, true, vivid, or contrasting. A value is assigned to each classification to be used to determine where in the color family range to put a color recommendation. In the situation of a contrasting individual, the system reverts back to taking the first digits of each of the SHE values before averaging, and assigning to each of those values a light, true, or vivid characterization. The overall classification number may therefore be defined as the value of the average. The values of each of the individual numbers of the individual SHE colors may be used for a contrasting individual.

In the above embodiment, for example, if the coloring of the individual is not contrasting, then the values for the skin, hair, and eyes may be averaged to provide a single value. At this point, it may be best to individually categorize the hair, the skin, and the eyes as either warm, cool, or neutral. These ranges are selected by expert analysis, and correspond to the amount of yellow (warm), the amount of blue (cool), or the balance therebetween. Typically, neutrals are in the range of equal parts of yellow and blue, and may even have very little but about equal parts of either one.

The situation of the contrasting individual takes a particular approach. For example, someone who has dark hair and light skin, or light hair and dark skin may be considered a contrasting individual. In such a situation, one may find outliers. For example, if the hair color shows up in the light portion of the palette, while the skin color shows up in the dark portion of the palette, separated by a full range (the middle section), then an individual may be automatically determined to be contrasting. Similarly, an individual or a color expert may detect that an individual is contrasting.

If an individual is contrasting then the skin, hair, and eye colors are not added and averaged. The output is by body color center tables. That is, skin may have its own table, hair may have its own table, and eyes may have their own table. An individual will be characterized as contrasting if two body center characteristics are light and one vivid, or if two are vivid, and one is light. Accordingly, the color selections will then thereafter be made for body color centers, and not for the overall subject. The contrasting category can be divided into dark contrasting, light contrasting, or the like depending on which sets of color constituents dominate.

A determination 200 of color class is typically based upon an expert system analysis of colors, and division of colors into classes. Likewise, the entire universe of color may be either divided, reduced, or both, in order to determine ranges of colors that will be considered.

In one system and method in accordance with the invention, a limited set of colors through a specific range is selected in each axis of a color space. Likewise, typically, boundaries are set on particular colors, and colors between two boundaries along any particular parameter of color may be included in the range of colors.

That is, a color family may include a number of colors extending between a lower and upper boundary of any particular characteristic of that color. For example, lightness and darkness may represent boundaries at opposite extremes. Similarly, a particular color constituent or feature (e.g. red-green, or blue-yellow) may represent another axis along which a family of colors may be selected.

Thus, the determination process 200 may determine for the color that was scanned 194 the color class of the color of one or more attributes, one or more combinations of those attributes, or any combination thereof.

Creation 202 may involve use of expert knowledge as well. That is, the color palettes output by the creation step 202 typically include colors that correspond to the colors of the scanned subject. Nevertheless, for certain individuals, such as those in the vivid class, tending to have darker colors of hair, eyes, and skin, the color palette may actually have colors very different from those scanned. Therefore, vivid, highly saturated colors from all colors in the color space may be used, to complement the rather neutral tones of a "vivid" color type.

Likewise, color palettes may be matched to particular attributes. For example, a contrasting color type of subject will typically benefit from colors that match hair, eyes, and skin individually, rather than an average thereof. Meanwhile, people who are light or true in coloring may benefit from colors that match an average of the color scheme of the subject.

Thus, color families may be selected based on the skin value, taken out of a skin table, the hair value taken out of a hair table, and the eye value taken out of an eye table. The system may then provide or output a list of colors. In one embodiment, the color list will include color families, and for each color family, a warm series of colors from lightest to darkest, a cool series of colors, from lightest to darkest, and a neutral set of colors from lightest to darkest.

The color families may be selected in accordance with the color list. Each color family may include the scale from lightest to darkest of the appropriate colors. The color family scale points of lightest to darkest may be set by each body color center (e.g. hair, skin, eyes). A mid-range of the color family for each color range may also be provided. For each color family, a tone, tint, or shade may also be evaluated and added such that colors corresponding to a particular attribute are toned, tinted, or shaded to match the tone, tint, or shade of the attribute.

For example, if the initial skin value entered was found to be warm, then the system may select each color family in the color family table, or the table system that has a temperature that matches, for example, the warm skin color. The color values from a standardized scale, (LAB, XYZ, RGB, etc.) may then be returned from the color table or color family table. These values make up the color family range in which colors are candidates to be selected.

Next, depending on the overall classification found for the average SHE values, an individual's color may be pulled from the color range found in the color table or color family table. If the scale is set to run from zero to one hundred, then the zero end would include colors representing the lightest colors in the color family.

For example, in an LAB system, the lightest colors are designated as lower valued or beginning end points. The one hundred end of the scale consists of the darkest consistent colors of the family in an LAB or other color system. If the lightest constituent color in a color family is designated as B (beginning), and the darkest color in a family is designated as E (end), then selecting a correct color is a solution to the equation: Output Value=(E−B)*X+B, where X is the subject's color classification value. Classification values have been determined within each range of light, true, or vivid. Mid points work. However, preferred results use a value of X=11% for light, X=47% for true, and X=100% for vivid.

In one embodiment, a power color may be selected. A power color is one that is more intense than the eye, but maintains the proper coloring and temperature for the individual. A color, being more intense than the eye, tends to have less of tint and shade, and more pure hue.

Intensifiers may also be provided in the palette. Intensifiers are colors that are complementary, opposite on the color wheel, to the existing coloring of an individual. Thus, these colors are bolder, being opposites, and tend to accent existing coloring by contrast, rather than by bringing out the existing color itself through a match.

Finally, to the palette may be added the primary and secondary colors (ROYGBIV and CHAKRA colors), as well as the metals such as copper, silver, brass, gold, and bronze.

In one embodiment, one of the attributes, such as the hair color, may be omitted. This may be due to the fact that hair color has actually been modified, or due to the lack of hair. Accordingly, a reduced palette of colors may be provided, and a reduced set of colors may be taken for evaluation.

According to the output of the creation step 202, a presentation step 204 may provide to a subject a set of colors for use in selecting products to match one's coloring.

The colors output by the creation step 202 may be converted to a standardized array, such as an LAB or RGB color scheme and output to a computer that produces a panel containing each color in the palette. For example, if a standard LAB system is used in the creation step 202, then the numbers for that LAB system value of a color may be converted to an RGB color scheme in order to be added to a palette presentable on a computer monitor to the subject. An objective mapping of such data has been programmed in one embodiment of an apparatus and method in accordance with the invention.

A palette may be created as an array of color swatches identifying typical cosmetic colors, with ranges of light and dark for each, based on the attributes of the SHE values entered. The entire array may be returned to the subject or consultant. Typically, only the first several colors of an array may be used. For example, eight colors including skin, skin intensifier, hair, hair intensifier, eye, eye intensifier, power, and power intensifier may be returned. In other embodiments, only the colors representing skin, hair and eyes are returned. At this point, depending on a subjective evaluation by a subject, consultant, or both, the process may be repeated or may be accepted. If accepted, then the entire palette may be output showing a palette having a full range of acceptable colors. Otherwise, the process may be repeated until acceptance. Presentation 204 may be by means of a computer screen, a display of a PDA, cell phone, or the like, a printout of a series of numbers that can be matched to products, or a printed palette of colors to be compared in a side-by-side comparison by a purchaser. Likewise, color swatches, or the like may be used as the presentation 204 medium of choice. The presentation 204 may occur at home on a computer, on a computer screen of a service provider, or on an output device associated with a vendor of products.

Providing 206 product suggestions may result from a computer providing a match-up of products within an inventory of a seller or a manufacturer, or from a consultant, or from an individual. Thus, providing 206 the product suggestions or matches may be accomplished in any way that provides an ability of a subject to identify products with the color analysis provided.

In one embodiment, providing 206 product suggestions may include selecting products matching both the customized color palette and other pre-determined characteristics. For example, a purchaser may provide answers to questions regarding body measurements, body shape, and the like. The answers may then be evaluated to suggest patterns, angles, fabrics, textures, and other features appropriate for that purchaser. Like the color palette, the suggestions may be downloadable to a cell phone, PDA, or other output device. Further, the suggestions may be correlated with the color palette such that the product suggestions are both color and body type appropriate.

In accordance with another aspect of the present invention, the computerized, personal-color analysis system may be advertised and marketed according to an incentivized marketing program. For example, in one embodiment, membership in a color analysis program may be advertised on a web page broadcast over the Internet. Purchase of a membership may include free use of a scanner or other input device 24, discounts on skin care and cosmetic products, a free customized color palette, free audio programs relating to fashion and makeup, and free podcasts, teleconferences, monthly fashion tips, and the like. Purchase of a membership may further authorize the purchaser to receive a free product incentive, such as lipstick.

When the membership fee is received, the purchaser may use the scanner or other input device 24 for a period of fourteen (14) days. If the scanner or other input device 24 is not returned within the fourteen (14) day period, the purchaser may be charged for the total price of the scanner or other input device 24. In one embodiment, the total price of the scanner is four hundred fifty dollars ($450.00) and may be paid in three (3) equal installments of one hundred fifty dollars ($150.00) each. While in possession of the scanner or other input device 24, the purchaser may perform multiple color analyses, although only the purchaser's own personal color analysis is included in the membership. Additional color analyses may be billed separately.

The incentivized marketing program may also be extended to include incentives on products related to the color analysis. For example, the purchaser may receive a thirty (30) day trial offer for skin care or cosmetic products. A product incentive, such as lipstick in a color included in the purchaser's color palette, may be included in the trial offer. The purchaser may receive a trial skin care or cosmetic product that may be returned within thirty (30) days free of charge. Otherwise, the purchaser may be charged for the full amount of the skin care or cosmetic product.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. At a computer system, the computer system including a processor, the computer system also including rules defining how to identify colors that are aesthetically appropriate for adorning a human subject, a method for recommending a customized color palette for a human subject, the customized color palette containing a plurality of colors selected to enhance the appearance of the human subject, the method comprising:

computing the natural coloring of the human subject, including:
accessing scanner output data for a plurality of physical attributes of the human subject, the plurality of physical attributes including a skin attribute of the human subject, a hair attribute of the human subject, and an eyes attribute of the human subject, the scanner output data including:
skin attribute data corresponding to the skin attribute, the skin attribute data measured by a scanner adapted to scan skin,
hair attribute data corresponding to the hair attribute, the hair attribute data measured by a scanner adapted to scan hair, and
eyes attribute data corresponding to the eyes attribute, the eyes attribute data measured by a scanner adapted to scan eyes,
processing the scanner output data to identify a general color corresponding to each of the plurality of physical attributes, including:
identifying a general skin color of the human subject from the skin attribute data,
identifying a general hair color of the human subject from the hair attribute data, and
identifying a general eye color of the human subject from the eyes attribute data;
mapping each of the general skin color, the general hair color, and the general eye color to a value in a color scheme, the color scheme representing colors using a value ranging from low values representing colors in a light category, middle values representing colors in a true category, and high values representing colors in a vivid category such that each of a general skin color value, a general hair color value, and a general eye color value is determined, the light category including colors that are lighter than colors in the true category and the vivid category including colors that are darker than colors in the true category;

determining, using the color scheme, a classification for the human subject, the classification being selected from the light category, the true category, the vivid category, and a contrasting category, determining the classification comprising:

comparing the general skin color value, the general hair color value, and the general eye color value of the human subject to the values of the colors in the color scheme to identify within which category each of the general skin color value, the general hair color value, and the general eye color value is included;

when each of the general skin color value, the general hair color value, and the general eye color value is identified as being included within the same category or within two adjacent categories, generating an average of the general skin color value, the general hair color value, and the general eye color value and identifying within which of the categories the average is included and assigning the identified category as the classification for the human subject; and when one of the general skin color value, the general hair color value, and the general eye color value is identified as being included within the light category or the vivid category while the other two of the general skin color value, the general hair color value, and the general eye color value is identified as being included within the vivid category or the light category respectively, assigning the contrasting category as the classification for the human subject; and the processor formulating the customized color palette for the human subject based on the classification of the human subject, including:

when the classification is one of the light category, the true category, or the vivid category, including within the customized color palette one or more colors from the corresponding category of the color scheme such that the one or more colors match the human subject's coloring as defined by the average of the general skin color value, the general hair color value, and the general eye color value;

when the classification is the contrasting category, including within the customized color palette one or more colors from the color scheme for each of the general skin color value, the general hair color value, and the general eye color value such that the one or more colors each match the corresponding general skin color, general hair color, or general eye color; and displaying the customized color palette to the human subject.

2. The method of claim 1, wherein the one or more colors included in the customized color palette comprise ranges of light to dark for each of the one or more colors.

3. The method of claim 2, wherein, when the classification is the vivid category, the method further comprises:

including one or more saturated colors from the light or true category.

4. The method of claim 1, further comprising: including a power color in the customized color palette, the power color being a fully saturated hue corresponding to the general eye color.

5. At a computer system, the computer system including a processor, the computer system also including rules defining how to identify colors that are aesthetically appropriate for adorning a human subject, a method for recommending a customized color palette for a human subject, the customized color palette containing a plurality of colors selected to enhance the appearance of the human subject, the method comprising:

computing the natural coloring of the human subject, including:

accessing scanner output data for a plurality of physical attributes of the human subject, the plurality of physical attributes including a skin attribute of the human subject and another attribute of the human subject, the other attribute selected from among a hair attribute and an eyes attribute, the scanner output data including:

skin attribute data corresponding to the skin attribute, the skin attribute data measured by a scanner adapted to scan skin, and other attribute data corresponding to the other attribute, the other attribute data measured by a scanner adapted to scan another physical feature of the human subject, and processing the scanner output data to identify a general color corresponding to each of the plurality of physical attributes, including:

identifying a general skin color of the human subject from the skin attribute data, identifying a general color of the other physical feature of the human subject from the other attribute data;

mapping the general skin color and the general color to a value in a color scheme, the color scheme representing colors using a value ranging from low values representing colors in a light category, middle values representing colors in a true category, and high values representing colors in a vivid category such that a general skin color value and general color value is determined, the light category including colors that are lighter than colors in the true category and the vivid category including colors that are darker than colors in the true category;

determining, using the color scheme, a classification for the human subject, the classification being selected from a light category, a true category, a vivid category, and a contrasting category, determining the classification comprising:

comparing the general skin color value and the general color value of the human subject to the values of the colors in the color scheme to identify within which category each of the general skin color value and the general color value is included;

when each of the general skin color value and the general color value is identified as being included within the same category or within two adjacent categories, generating an average of the general skin color value and the general color value and identifying within which of the categories the average is included and assigning the identified category as the classification for the human subject; and when one of the general skin color value or the general color value is identified as being included within the light category while the other of the general skin color value and the general color value is identified as being included within the vivid category, assigning the contrasting category as the classification for the human subject; and the processor formulating the customized color palette for the human subject based on the classification of the human subject, including:

when the classification is one of the light category, the true category, or the vivid category, including within the customized color palette one or more colors from the corresponding category of the color scheme such that the one or more colors match the human subject's coloring as defined by the average of the general skin color value and the general color value;

when the classification is the contrasting category, including within the customized color palette one or more colors for each of the general skin color value and the general color value such that the one or more colors each match the corresponding general skin color or general color; and displaying the customized color palette to the human subject.

6. The method of claim 5, wherein the one or more colors included in the customized color palette comprise ranges of light to dark for each of the one or more colors.

7. The method of claim 6, wherein, when the classification is the vivid category, the method further comprises:
including one or more saturated colors from the light or true category.

8. The method of claim 5, further comprising: including an intensifier color in the customized color palette, the intensifier color being opposite one of: the general skin color and the general color of the other physical feature on a color wheel.

9. The method of claim 5, further comprising: including a power color in the customized color palette, the power color being a fully saturated hue corresponding to the general color of the other physical feature.

10. The method of claim 5, wherein the values in the color scheme are numbers, and the numbers for colors in the light category are smaller than numbers for colors in the true category, and the numbers for colors in the true category are smaller than the numbers for colors in the vivid category.

11. The method of claim 10, wherein at least one of the one or more colors included in the customized color palette is selected for inclusion based on the formula: $(E-B)*X+B$, where E represents the number of the darkest color in the color scheme, B represents the number of the lightest color in the color scheme, and X represents a percentage based on the classification of the human subject.

12. The method of claim 11, wherein the value X for the light category is lower than the value of X for the vivid category.

13. The method of claim 5, further comprising:
including at least one color in the color palette based on one or more of: a temperature, saturation, tone, tint, or shade of the general skin color or the general color.

14. At a computer system, the computer system including a processor, the computer system also including rules defining how to identify colors that are aesthetically appropriate for adorning a human subject, a method for recommending a customized color palette for a human subject, the customized color palette containing a plurality of colors selected to enhance the appearance of the human subject, the method comprising:
computing the natural coloring of the human subject, including:
accessing scanner output data for a first physical attribute of the human subject and a second different physical attribute of the human subject, the scanner output data including:
first attribute data corresponding to the first physical attribute and second attribute data corresponding to the second physical attribute, the first attribute data and the second attribute data measured by a scanner adapted to scan the first physical attribute and the second different physical attribute;
the processor processing the first attribute data to identify a first general color for the first physical attribute;
the processor processing the second different attribute data to identify a second different general color for the second physical attribute;
mapping each of the first and second general color to a value in a color scheme, the color scheme representing colors using a value ranging from low values representing colors in a light category, middle values representing colors in a true category, and high values representing colors in a vivid category such that each of a first general color value and a second general color value is determined, the light category including colors that are lighter than colors in the true category and the vivid category including colors that are darker than colors in the true category;
determining, using the color scheme, a classification for the human subject, the classification being selected from the light category, the true category, the vivid category, and a contrasting category, determining the classification comprising:
comparing the first general color value and the second general color value of the human subject to the colors of the color scheme to identify within which category each of the first and second general color values is included;
when each of the first and second general color values is identified as being included within the same category or within two adjacent categories, generating an average of the first and second general color values and identifying within which of the categories the average is included and assigning the identified category as the classification for the human subject; and
when one of the first general color value or the second general color value is identified as being included within the light category while the other of the first general color value and the second general color value is identified as being included within the vivid category, assigning the contrasting category as the classification for the human subject; and
the processor formulating the customized color palette for the human subject based on the classification of the human subject, including:
when the classification is one of the light category, the true category, or the vivid category, including within the customized color palette one or more colors from the corresponding category of the color scheme such that the one or more colors match the human subject's coloring as defined by the average of the first and second general color values;
when the classification is the contrasting category, including within the customized color palette one or more colors for each of the first and second general color values such that the one or more colors each match the corresponding first or second general color; and
displaying the customized color palette to the human subject.

15. The method of claim 14, further comprising: including a power color in the customized color palette, the power color being a fully saturated hue corresponding to the first general color.

16. The method of claim 14, further comprising:
including an intensifier color in the customized color palette, the intensifier color being opposite the first general color on a color wheel.

17. The method of claim 14, further comprising:
including at least one color in the color palette based on one or more of: a temperature, saturation, tone, tint, or shade of the first or second general color.

18. The method of claim 14, wherein the values in the color scheme are numbers, and the numbers for colors in the light category are smaller than numbers for colors in the true category, and the numbers for colors in the true category are smaller than the numbers for colors in the vivid category.

19. The method of claim 14, wherein at least one of the one or more colors included in the customized color palette is selected for inclusion based on the formula: $(E-B)*X+B$, where E represents the number of the darkest color in the color scheme, B represents the number of the lightest color in the color scheme, and X represents a percentage based on the classification of the human subject.

20. The method of claim 14, wherein accessing scanner output data comprises accessing scanner output data collected by mobile electronic device.

* * * * *